US012698420B2

(12) United States Patent
Lem et al.

(10) Patent No.: US 12,698,420 B2
(45) Date of Patent: Aug. 4, 2026

(54) ROOFING MEMBRANES AND RELATED METHODS

(71) Applicant: BMIC LLC, Dallas, TX (US)

(72) Inventors: Paul C. Lem, Mountain Lakes, NJ (US); Li-Ying Yang, Whippany, NJ (US)

(73) Assignee: BMIC LLC, Dallas, TX (US)

( * ) Notice: Subject to any disclaimer, the term of this patent is extended or adjusted under 35 U.S.C. 154(b) by 214 days.

(21) Appl. No.: 18/794,520

(22) Filed: Aug. 5, 2024

(65) Prior Publication Data

US 2025/0034435 A1     Jan. 30, 2025

Related U.S. Application Data

(63) Continuation of application No. 18/479,607, filed on Oct. 2, 2023, now Pat. No. 12,084,603, which is a continuation of application No. 18/151,140, filed on Jan. 6, 2023, now Pat. No. 11,807,785.

(60) Provisional application No. 63/298,068, filed on Jan. 10, 2022.

(51) Int. Cl.
| | |
|---|---|
| *C09J 7/29* | (2018.01) |
| *B32B 5/02* | (2006.01) |
| *B32B 27/12* | (2006.01) |
| *B32B 27/18* | (2006.01) |
| *B32B 27/32* | (2006.01) |

(Continued)

(52) U.S. Cl.
CPC ................. *C09J 7/29* (2018.01); *B32B 5/024* (2013.01); *B32B 27/12* (2013.01); *B32B 27/18* (2013.01); *B32B 27/32* (2013.01); *E04D 5/10* (2013.01); *E04D 5/148* (2013.01); *B32B 2250/03* (2013.01); *B32B 2262/0276*

(2013.01); *B32B 2270/00* (2013.01); *B32B 2419/06* (2013.01); *C09J 2423/106* (2013.01); *C09J 2453/006* (2013.01)

(58) Field of Classification Search
CPC ......... B32B 2419/06; E04D 5/00; E04D 5/06; E04D 5/10; E04D 5/148
See application file for complete search history.

(56) References Cited

U.S. PATENT DOCUMENTS

| | | |
|---|---|---|
| 6,696,125 B2 | 2/2004 | Zanchetta et al. |
| 6,864,195 B2 | 3/2005 | Peng |
| 7,351,462 B2 | 4/2008 | Friedman et al. |

(Continued)

*Primary Examiner* — Zachary M Davis

(74) *Attorney, Agent, or Firm* — GREENBERG TRAURIG, LLP

(57)     ABSTRACT

Some embodiments relate to a roofing membrane. The roofing membrane comprises a scrim. The scrim has a top surface and a bottom surface. The roofing membrane comprises a cap layer on the top surface of the scrim. The cap layer comprises a first non-styrenic polypropylene polymer, a first polypropylene impact copolymer, and a first olefin block copolymer. The roofing membrane comprises a core layer on the bottom surface of the scrim. The core layer comprises a second non-styrenic polypropylene polymer, a second polypropylene impact copolymer, and a second olefin block copolymer. The roofing membrane is configured to prevent migration of at least one oil from a layer to the roofing membrane. Some embodiments relate to a roofing structure comprising the roofing membrane, a method for installing the roofing membrane, and the like.

20 Claims, 3 Drawing Sheets

(51) Int. Cl.
  *E04D 5/10*        (2006.01)
  *E04D 5/14*        (2006.01)

(56)            References Cited

U.S. PATENT DOCUMENTS

| | | | |
|---|---|---|---|
| 7,550,205 B2 | 6/2009 | Getlichermann et al. | |
| 7,666,491 B2 | 2/2010 | Yang et al. | |
| 7,749,924 B2 | 7/2010 | Peng | |
| 7,851,051 B2 | 12/2010 | DeJarnette et al. | |
| 7,882,671 B2 | 2/2011 | Douglas et al. | |
| 8,530,034 B2 | 9/2013 | Khan et al. | |
| 8,623,499 B2 | 1/2014 | Viasnoff | |
| 8,900,718 B2 | 12/2014 | Peng | |
| 9,145,498 B2 | 9/2015 | Ultsch | |
| 9,217,249 B2 | 12/2015 | Hong et al. | |
| 9,452,560 B2 | 9/2016 | Kalkanoglu et al. | |
| 9,540,820 B2 | 1/2017 | Kalkanoglu et al. | |
| 9,670,353 B2 | 6/2017 | Peng et al. | |
| 9,834,935 B2 | 12/2017 | Loftus et al. | |
| 9,920,515 B2 | 3/2018 | Xing et al. | |
| 9,987,786 B2 | 6/2018 | Stoiljkovic et al. | |
| 10,015,933 B2 | 7/2018 | Boldrin | |
| 10,156,075 B1 | 12/2018 | McDonough | |
| 10,179,852 B2 | 1/2019 | Gossi et al. | |
| 10,260,237 B2 | 4/2019 | Hubbard et al. | |
| 10,301,828 B2 | 5/2019 | Shepherd | |
| 10,414,140 B2 | 9/2019 | Zacarias et al. | |
| 10,450,752 B2 | 10/2019 | Paradis et al. | |
| 10,480,192 B2 | 11/2019 | Xing et al. | |
| 10,619,037 B2 | 4/2020 | Peng et al. | |
| 10,669,414 B2 | 6/2020 | Li et al. | |
| 10,801,207 B2 | 10/2020 | French et al. | |
| 10,844,200 B2 | 11/2020 | Kortmeyer et al. | |
| 10,907,355 B2 | 2/2021 | Hubbard et al. | |
| 10,914,063 B2 | 2/2021 | Lee et al. | |
| RE48,555 E | 5/2021 | Cancio et al. | |
| 11,015,085 B2 | 5/2021 | Bruns et al. | |
| 11,065,849 B2 | 7/2021 | Ackermann et al. | |
| 11,111,606 B2 | 9/2021 | Baer et al. | |
| 11,242,684 B2 | 2/2022 | Wang et al. | |
| 11,807,785 B2 | 11/2023 | Lem et al. | |
| 2002/0102422 A1 | 8/2002 | Hubbard et al. | |
| 2009/0269565 A1* | 10/2009 | Peng | E04D 5/10 |
| | | | 428/339 |
| 2015/0024159 A1 | 1/2015 | Bess et al. | |
| 2015/0038629 A1* | 2/2015 | Ultsch | D06N 3/0063 |
| | | | 524/436 |
| 2015/0176281 A1 | 6/2015 | Yang et al. | |
| 2015/0314511 A1 | 11/2015 | Stoiljkovic et al. | |
| 2017/0203555 A1 | 7/2017 | Wang et al. | |
| 2018/0094439 A1 | 4/2018 | Wang et al. | |
| 2018/0222162 A1 | 8/2018 | Arteaga Larios et al. | |
| 2018/0281347 A1 | 10/2018 | Gossi | |
| 2020/0307151 A1 | 10/2020 | Ben-Daat et al. | |
| 2021/0002898 A1 | 1/2021 | Knebel et al. | |
| 2021/0095474 A1 | 4/2021 | Yang et al. | |
| 2021/0113970 A1 | 4/2021 | Stainer et al. | |
| 2021/0171808 A1 | 6/2021 | Ackermann et al. | |
| 2021/0172174 A1 | 6/2021 | Ackermann et al. | |

* cited by examiner

ROOFING MEMBRANES AND RELATED METHODS

CROSS-REFERENCE TO RELATED APPLICATIONS

The present application is a continuation of U.S. patent application Ser. No. 18/479,607, filed Oct. 2, 2023, entitled "ROOFING MEMBRANES AND RELATED METH-ODS," which is a continuation of U.S. patent application Ser. No. 18/151,140, filed Jan. 6, 2023, entitled "ROOFING MEMBRANES AND RELATED METHODS," now U.S. Pat. No. 11,807,785, which claims priority to and benefit of U.S. Provisional Patent Application No. 63/298,068, filed Jan. 10, 2022, entitled "ROOFING MEMBRANES AND RELATED METHODS," the entirety of which are herein incorporated by reference.

FIELD

This disclosure generally relates to roofing membranes having improved properties and related methods.

BACKGROUND

In roofing applications, materials that migrate from certain roofing components to roofing membranes usually degrade the performance and durability of the roofing membranes. The migration of components can further result in undesirable aesthetic features, such as, mole runs. Mole runs are generally undesirable ridges in roofing membranes.

SUMMARY

Some embodiments relate to a roofing membrane. In some embodiments, the roofing membrane comprises a scrim. In some embodiments, the scrim has a top surface and a bottom surface. In some embodiments, the roofing membrane comprises a cap layer on the top surface of the scrim. In some embodiments, the cap layer comprises 10% to 90% by weight of a first non-styrenic polypropylene copolymer based on a total weight of the cap layer. In some embodiments, the first non-styrenic polypropylene copolymer comprises ethylene. In some embodiments, the cap layer comprises 10% to 90% by weight of a first polypropylene impact copolymer based on the total weight of the cap layer. In some embodiments, the first polypropylene impact copolymer comprises a first olefin. In some embodiments, the cap layer comprises 1% to 10% by weight of a first olefin block copolymer based on the total weight of the cap layer. In some embodiments, the roofing membrane comprises a core layer on the bottom surface of the scrim. In some embodiments, the core layer comprises 10% to 90% by weight of a second non-styrenic polypropylene copolymer based on a total weight of the core layer. In some embodiments, the second non-styrenic polypropylene copolymer comprises ethylene. In some embodiments, the core layer comprises 10% to 90% by weight of a second polypropylene impact copolymer based on the total weight of the core layer. In some embodiments, the second polypropylene impact copolymer comprises a second olefin. In some embodiments, the core layer comprises 1% to 10% by weight of a second olefin block copolymer based on a total weight of the core layer.

In some embodiments, the cap layer comprises 20% to 60% by weight of the first non-styrenic polypropylene copolymer based on the total weight of the cap layer.

In some embodiments, the cap layer comprises 10% to 50% by weight of the first polypropylene impact copolymer based on the total weight of the cap layer.

In some embodiments, a weight ratio of the first polypropylene impact copolymer to the first non-styrenic polypropylene copolymer is 1:1 to 1:5.

In some embodiments, the first olefin block copolymer comprises at least one of ethylene-1-octene copolymer, propylene-ethylene copolymer, ethylene-1-butene copolymer, propylene-ethylene-1-butene copolymer, ethylene-1-hexene copolymer, ethylene-1-octene copolymer, ethylene-1-hexene-1-octene copolymer, propylene-ethylene-1-hexene copolymer, propylene-ethylene-1-octene copolymer, ethylene-1-butene-1-octene copolymer, or any combination thereof.

In some embodiments, the core layer comprises 20% to 60% by weight of the second non-styrenic polypropylene copolymer based on the total weight of the core layer.

In some embodiments, the core layer comprises 10% to 50% by weight of the second polypropylene impact copolymer based on the total weight of the core layer.

In some embodiments, a weight ratio of the second polypropylene impact copolymer to the second non-styrenic polypropylene copolymer is 1:10 to 1:15.

In some embodiments, the second olefin block copolymer comprises at least one of ethylene-1-octene copolymer, propylene-ethylene copolymer, ethylene-1-butene copolymer, propylene-ethylene-1-butene copolymer, ethylene-1-hexene copolymer, ethylene-1-octene copolymer, ethylene-1-hexene-1-octene copolymer, propylene-ethylene-1-hexene copolymer, propylene-ethylene-1-octene copolymer, ethylene-1-butene-1-octene copolymer, or any combination thereof.

In some embodiments, the cap layer having a thickness of 10 mil to 45 mil.

In some embodiments, the core layer having a thickness of 10 mil to 45 mil.

In some embodiments, the roofing membrane further comprises an adhesive layer on a bottom surface of the core layer.

Some embodiments relate to a roofing membrane. In some embodiments, the roofing membrane comprises a scrim. In some embodiments, the scrim has a top surface and a bottom surface. In some embodiments, the roofing membrane comprises a cap layer on the top surface of the scrim. In some embodiments, the cap layer comprises 10% to 90% by weight of a first non-styrenic polypropylene copolymer based on a total weight of the cap layer. In some embodiments, the first non-styrenic polypropylene copolymer comprises ethylene. In some embodiments, the cap layer comprises 10% to 90% by weight of a first polypropylene impact copolymer based on the total weight of the cap layer. In some embodiments, the first polypropylene impact copolymer comprises a first olefin. In some embodiments, the cap layer comprises 1% to 10% by weight of a first polypropylene elastomer based on the total weight of the cap layer. In some embodiments, the roofing membrane comprises a core layer on the bottom surface of the scrim. In some embodiments, the core layer comprises 10% to 90% by weight of a second non-styrenic polypropylene copolymer based on a total weight of the core layer. In some embodiments, the second non-styrenic polypropylene copolymer comprises ethylene. In some embodiments, the core layer comprises 10% to 90% by weight of a second polypropylene impact copolymer based on the total weight of the core layer. In some embodiments, the second polypropylene impact copolymer comprises a second olefin. In some embodiments, the core layer comprises 1% to 10% by weight of a second polypropylene elastomer based on a total weight of the core layer.

In some embodiments, a weight ratio of the first polypropylene impact copolymer to the first non-styrenic polypropylene copolymer is 1:1 to 1:5.

In some embodiments, the first polypropylene elastomer is a random polypropylene copolymer comprising polypropylene units with random distribution of alpha-olefin units.

In some embodiments, a weight ratio of the second polypropylene impact copolymer to the second non-styrenic polypropylene copolymer is 1:10 to 1:15.

In some embodiments, the second polypropylene elastomer is a random polypropylene copolymer comprising polypropylene units with random distribution of alpha-olefin units.

Some embodiments relate to a method of installing a roofing membrane. In some embodiments, the method comprises obtaining a roofing membrane. In some embodiments, the roofing membrane comprises a scrim. In some embodiments, the scrim has a top surface and a bottom surface. In some embodiments, the roofing membrane comprises a cap layer on the top surface of the scrim. In some embodiments, the cap layer comprises 10% to 90% by weight of a first non-styrenic polypropylene copolymer based on a total weight of the cap layer. In some embodiments, the first non-styrenic polypropylene copolymer comprises ethylene. In some embodiments, the cap layer comprises 10% to 90% by weight of a first polypropylene impact copolymer based on the total weight of the cap layer. In some embodiments, the first polypropylene impact copolymer comprises a first olefin. In some embodiments, the cap layer comprises 1% to 10% by weight of a first olefin block copolymer based on the total weight of the cap layer. In some embodiments, the roofing membrane comprises a core layer on the bottom surface of the scrim. In some embodiments, the core layer comprises 10% to 90% by weight of a second non-styrenic polypropylene copolymer based on a total weight of the core layer. In some embodiments, the second non-styrenic polypropylene copolymer comprises ethylene. In some embodiments, the core layer comprises 10% to 90% by weight of a second polypropylene impact copolymer based on the total weight of the core layer. In some embodiments, the second polypropylene impact copolymer comprises a second olefin. In some embodiments, the core layer comprises 1% to 10% by weight of a second olefin block copolymer based on a total weight of the core layer. In some embodiments, the roofing membrane comprises an adhesive layer on a bottom surface of the core layer. In some embodiments, the method comprises applying the adhesive layer of the roofing membrane to a roofing substrate.

In some embodiments, the applying comprising adhering.

In some embodiments, the roofing substrate comprises at least one of plywood, cement, concrete, asphaltic shingles, compressed fiberboard, gypsum, oriented strand board, concrete masonry units, masonry blocks, bricks, polyiso foam, polyisocyanurate, steel, aluminum, copper, minerals, limestone, thermoplastic polyolefin, polyvinyl chloride, silicone, polyvinylidene fluoride, polymethyl methacrylate, acrylic, or any combinations thereof.

BRIEF DESCRIPTION OF THE DRAWINGS

Reference is made to the drawings that form a part of this disclosure, and which illustrate embodiments in which the materials and methods described herein can be practiced.

DETAILED DESCRIPTION

Figure 1:
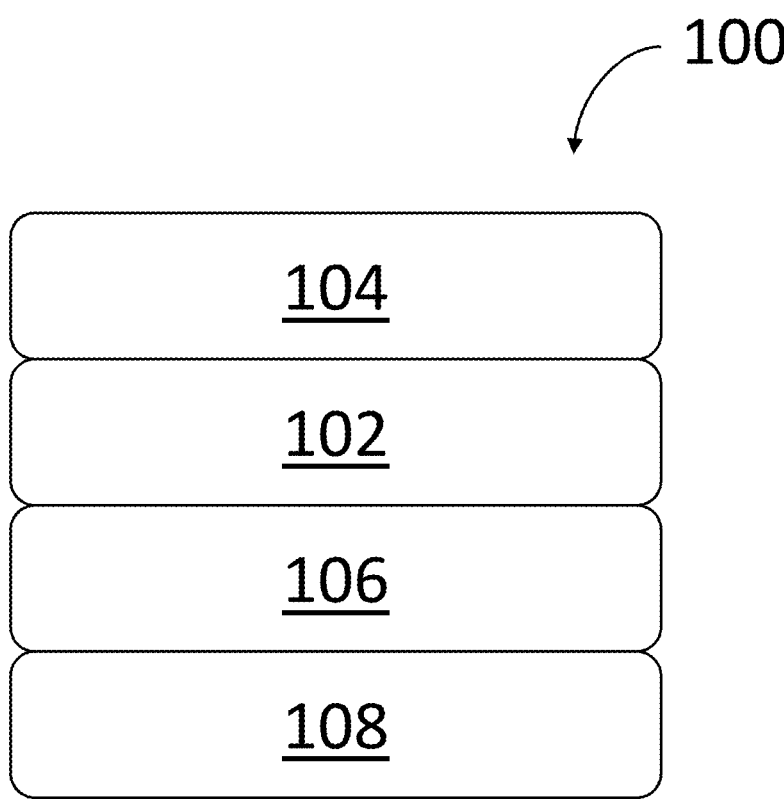
FIG. 1 is a schematic diagram of a roofing membrane, according to some embodiments.

Some embodiments relate to roofing membranes having improved properties and related methods.

In some embodiments, the roofing membranes exhibit one or more improvements relative to conventional roofing membranes. In some embodiments, the roofing membranes are configured to reduce migration of an oil component from adhesives and other substances in contact with (or proximal to) the roofing membranes. In some embodiments, the reduced migration of oil, or increased resistance to oil, reduces curling of the roofing membrane. In some embodiments, the roofing membranes are useful for increasing a flexibility of the roofing membranes. In some embodiments, the flexibility of the roofing membranes is increased over various temperature ranges, such as, for example, about 35° C. or less. In some embodiments, the roofing membranes are useful for increasing heat aging properties of the roofing membranes. In some embodiments, the roofing membranes are useful for increasing formulation processability. In some embodiments, the roofing membranes are useful for increasing a brittleness property at low temperatures. In some embodiments, the roofing membranes are useful for increasing at least one of tack, adhesion, or any combination thereof. In some embodiments, the increased tack and/or adhesion is observed at low temperatures.

In some embodiments, the roofing membrane comprises a scrim. In some embodiments, the scrim has a top surface and a bottom surface.

In some embodiments, the scrim comprises, consists of, or consists essentially of at least one of a woven fabric, a non-woven fabric, a knitted fabric, or any combination thereof. In some embodiments, the scrim comprises, consists of, or consists essentially of a fabric reinforcement. In some embodiments, the scrim comprises, consists of, or consists essentially of polyester. In some embodiments, the scrim comprises, consists of, or consists essentially of a fabric reinforcement comprising polyester. In some embodiment, the scrim comprises, consists of, or consists essentially of a glass fiber.

In some embodiments, the scrim has a thickness of 1 mil to 10 mil. In some embodiments, the scrim has a thickness of 2 mil to 10 mil. In some embodiments, the scrim has a thickness of 3 mil to 10 mil. In some embodiments, the scrim has a thickness of 4 mil to 10 mil. In some embodiments, the scrim has a thickness of 5 mil to 10 mil. In some embodiments, the scrim has a thickness of 6 mil to 10 mil. In some embodiments, the scrim has a thickness of 7 mil to 10 mil. In some embodiments, the scrim has a thickness of 8 mil to 10 mil. In some embodiments, the scrim has a thickness of 1 mil to 2 mil. In some embodiments, the scrim has a thickness of 1 mil to 3 mil. In some embodiments, the scrim has a thickness of 1 mil to 4 mil. In some embodiments, the scrim has a thickness of 1 mil to 5 mil. In some embodiments, the scrim has a thickness of 1 mil to 6 mil. In some embodiments, the scrim has a thickness of 1 mil to 7 mil. In some embodiments, the scrim has a thickness of 1 mil to 8 mil. In some embodiments, the scrim has a thickness of 1 mil to 9 mil. In some embodiments, the scrim has a thickness of

5 less than 1 mil. In some embodiments, the scrim has a thickness of greater than 10 mil.

In some embodiments, the roofing membrane comprises a cap layer. In some embodiments, the cap layer is disposed on the top surface of the scrim. In some embodiments, the cap layer is disposed on the scrim, in direct contact with the top surface of the scrim. That is, in some embodiments, no intermediate layer is disposed between the cap layer and the scrim. In some embodiments, an intermediate layer is disposed between the cap layer and the scrim. In some embodiments, the cap layer comprises one or more sublayers. For example, in some embodiments, the cap layer comprises at least one of a first sublayer, a second sublayer, a third sublayer, a fourth sublayer, a fifth sublayer, a sixth sublayer, a seventh sublayer, an eighth sublayer, a ninth sublayer, a tenth sublayer, or any combination thereof.

In some embodiments, the cap layer comprises a non-styrenic polypropylene polymer. In some embodiments, the cap layer comprises a first non-styrenic polypropylene polymer.

As used herein, the term "polypropylene polymer" refers to a polymer (e.g., a homopolymer, a copolymer, etc.) comprising propylene. In some embodiments, a polypropylene polymer comprises a polymer prepared by polymerizing one or more monomers, wherein at least one of the one or more monomers comprises a propylene monomer. In some embodiments, the polypropylene polymer is a polymer comprising at least 50% by weight (or mole percent) of polymer units derived from propylene based on a total weight (or total moles) of the polypropylene polymer.

As used herein, the term "non-styrenic," when used to modify a polymer (or other material), refers to a polymer (or material) that does not comprise styrene, whether the styrene is substituted or unsubstituted. In some embodiments, for example, the first non-styrenic polypropylene polymer does not comprise (is not) a crosslinked thermoplastic elastomer comprising substituted or unsubstituted styrene. In some embodiments, the first non-styrenic polypropylene polymer does not comprise (is not) at least one of a styrene-isoprene-styrene (SIS) polymer, styrene-butadiene-styrene (SBS), styrene-ethylene/butadiene-styrene (SEBS), styrene-ethylene-propylene-styrene (SEPS), a styrene-butadiene rubber (SBR), styrene-ethylene/propylene (SEP), or any combination thereof.

In some embodiments, the first non-styrenic polypropylene polymer comprises, consists of, or consists essentially of at least one of a polypropylene homopolymer, a polypropylene copolymer, or any combination thereof. In some embodiments, the polypropylene homopolymer comprises, consists of, or consists essentially of at least one of an isotactic polypropylene homopolymer, a syndiotactic polypropylene homopolymer, an atactic polypropylene homopolymer, or any combination thereof. In some embodiments, the polypropylene copolymer comprises, consists of, or consists essentially of at least one of a statistical polypropylene copolymer, a random polypropylene copolymer, a polypropylene block copolymer, or any combination thereof. In some embodiments, the polypropylene copolymer does not comprise isotactic polypropylene units. In some embodiments, the first non-styrenic polypropylene polymer is not, or is different from, a polypropylene impact copolymer. In some embodiments, the first non-styrenic polypropylene polymer is not, or is different from, an olefin block copolymer. In some embodiments, the polypropylene copolymer comprises polypropylene units and ethylene units.

In some embodiments, the first non-styrenic polypropylene polymer is a first non-styrenic polypropylene copolymer. In some embodiments, the first non-styrenic polypropylene copolymer comprises 50% to 100% by weight (or mole percent) of polymer units derived from propylene based on the total weight (or total moles) of the first non-styrenic polypropylene copolymer. In some embodiments, the first non-styrenic polypropylene copolymer comprises 50% to 95% by weight (or mole percent) of polymer units derived from propylene based on the total weight (or total moles) of the first non-styrenic polypropylene copolymer. In some embodiments, the first non-styrenic polypropylene copolymer comprises 50% to 90% by weight (or mole percent) of polymer units derived from propylene based on the total weight (or total moles) of the first non-styrenic polypropylene copolymer. In some embodiments, the first non-styrenic polypropylene copolymer comprises 50% to 80% by weight (or mole percent) of polymer units derived from propylene based on the total weight (or total moles) of the first non-styrenic polypropylene copolymer. In some embodiments, the first non-styrenic polypropylene copolymer comprises 50% to 70% by weight (or mole percent) of polymer units derived from propylene based on the total weight (or total moles) of the first non-styrenic polypropylene copolymer. In some embodiments, the first non-styrenic polypropylene copolymer comprises 50% to 60% by weight (or mole percent) of polymer units derived from propylene based on the total weight (or total moles) of the first non-styrenic polypropylene copolymer. In some embodiments, the first non-styrenic polypropylene copolymer comprises 60% to 99% by weight (or mole percent) of polymer units derived from propylene based on the total weight (or total moles) of the first non-styrenic polypropylene copolymer. In some embodiments, the first non-styrenic polypropylene copolymer comprises 70% to 99% by weight (or mole percent) of polymer units derived from propylene based on the total weight (or total moles) of the first non-styrenic polypropylene copolymer. In some embodiments, the first non-styrenic polypropylene copolymer comprises 80% to 99% by weight (or mole percent) of polymer units derived from propylene based on the total weight (or total moles) of the first non-styrenic polypropylene copolymer. In some embodiments, the weight percent (or mole percent) is based on the total weight (or total moles) of the first non-styrenic polypropylene copolymer based on the total weight (or total moles) of the first non-styrenic polypropylene copolymer.

In some embodiments, the first non-styrenic polypropylene copolymer comprises polymer units derived from ethylene. In some embodiments, the first non-styrenic polypropylene copolymer comprises less than 50% by weight (or mole percent) of polymer units derived from ethylene based on the total weight (or total moles) of the first non-styrenic polypropylene copolymer. In some embodiments, the first non-styrenic polypropylene copolymer comprises 1% to 49% by weight (or mole percent) of polymer units derived from ethylene based on the total weight (or total moles) of the first non-styrenic polypropylene copolymer. In some embodiments, the first non-styrenic polypropylene copolymer comprises 5% to 49% by weight (or mole percent) of polymer units derived from ethylene based on the total weight (or total moles) of the first non-styrenic polypropylene copolymer. In some embodiments, the first non-styrenic polypropylene copolymer comprises 10% to 49% by weight (or mole percent) of polymer units derived from ethylene based on the total weight (or total moles) of the first non-styrenic polypropylene copolymer. In some embodiments, the first non-styrenic polypropylene copolymer comprises 15% to 49% by weight (or mole percent) of polymer units derived from ethylene based on the total weight (or total moles) of the first non-styrenic polypropylene copolymer. In some embodiments, the first non-styrenic polypropylene copolymer comprises 20% to 49% by weight (or mole percent) of polymer units derived from ethylene based on the total weight (or total moles) of the first non-styrenic polypropylene copolymer. In some embodiments, the first non-styrenic polypropylene copolymer comprises 25% to 49% by weight (or mole percent) of polymer units derived from ethylene based on the total weight (or total moles) of the first non-styrenic polypropylene copolymer. In some embodiments, the first non-styrenic polypropylene copolymer comprises 30% to 49% by weight (or mole percent) of polymer units derived from ethylene based on the total weight (or total moles) of the first non-styrenic polypropylene copolymer. In some embodiments, the first non-styrenic polypropylene copolymer comprises 35% to 49% by weight (or mole percent) of polymer units derived from ethylene based on the total weight (or total moles) of the first non-styrenic polypropylene copolymer. In some embodiments, the first non-styrenic polypropylene copolymer comprises 40% to 49% by weight (or mole percent) of polymer units derived from ethylene based on the total weight (or total moles) of the first non-styrenic polypropylene copolymer. In some embodiments, the weight percent (or mole percent) is based on the total weight (or total moles) of the first non-styrenic polypropylene copolymer based on the total weight (or total moles) of the first non-styrenic polypropylene copolymer.

In some embodiments, the first non-styrenic polypropylene copolymer comprises polymer units derived from monomers and/or polymers other than ethylene. In some embodiments, the first non-styrenic polypropylene copolymer comprises polymer units derived from olefins (other than ethylene). For example, in some embodiments, the first non-styrenic polypropylene copolymer comprises polymer units derived from alpha-olefins. In some embodiments, the alpha-olefins comprise at least one of $C_2$ alpha-olefins, $C_4$-$C_{20}$ alpha-olefins, or any combination thereof. For example, in some embodiments, the first non-styrenic polypropylene copolymer comprises polymer units derived from at least one of $C_2$ alpha-olefins, $C_4$-$C_{20}$ alpha-olefins, $C_4$-$C_{18}$ alpha-olefins, $C_4$-$C_{20}$ alpha-olefins, $C_4$-$C_{16}$ alpha-olefins, $C_4$-$C_{14}$ alpha-olefins, $C_4$-$C_{12}$ alpha-olefins, $C_4$-$C_{10}$ alpha-olefins, $C_4$-$C_8$ alpha-olefins, $C_4$-$C_6$ alpha-olefins, $C_6$-$C_{20}$ alpha-olefins, $C_6$-$C_{18}$ alpha-olefins, $C_6$-$C_{16}$ alpha-olefins, $C_6$-$C_{14}$ alpha-olefins, $C_6$-$C_{12}$ alpha-olefins, $C_6$-$C_{10}$ alpha-olefins, $C_6$-$C_8$ alpha-olefins, $C_8$-$C_{20}$ alpha-olefins, $C_{10}$-$C_{20}$ alpha-olefins, $C_{10}$-$C_{12}$ alpha-olefins, $C_{10}$-$C_{16}$ alpha-olefins, $C_{10}$-$C_{18}$ alpha-olefins, $C_{20}$-$C_{30+}$ alpha-olefins, or any combination thereof. In some embodiments, the alpha-olefin comprises or is selected from the group consisting of at least one of 1-butene, 1-pentene, 1-hexene, 1-octene, 1-decene, 1-dodecene, 1-tetradecene, 1-hexadecene, 1-octadecene, 1-eicosene, 1-docosene, 1-tetracosene, 1-hexacosene, 1-octacosene, 1-triacontene, or any combination thereof.

In some embodiments, the cap layer comprises 10% to 99% by weight of the first non-styrenic polypropylene polymer based on the total weight of the cap layer. In some embodiments, the cap layer comprises 10% to 95% by weight of the first non-styrenic polypropylene polymer based on the total weight of the cap layer. In some embodiments, the cap layer comprises 10% to 90% by weight of the first non-styrenic polypropylene polymer based on the total weight of the cap layer. In some embodiments, the cap layer comprises 10% to 85% by weight of the first non-styrenic polypropylene polymer based on the total weight of the cap layer. In some embodiments, the cap layer comprises 10% to 80% by weight of the first non-styrenic polypropylene polymer based on the total weight of the cap layer. In some embodiments, the cap layer comprises 10% to 75% by weight of the first non-styrenic polypropylene polymer based on the total weight of the cap layer. In some embodiments, the cap layer comprises 10% to 70% by weight of the first non-styrenic polypropylene polymer based on the total weight of the cap layer. In some embodiments, the cap layer comprises 10% to 65% by weight of the first non-styrenic polypropylene polymer based on the total weight of the cap layer. In some embodiments, the cap layer comprises 10% to 60% by weight of the first non-styrenic polypropylene polymer based on the total weight of the cap layer. In some embodiments, the cap layer comprises 10% to 55% by weight of the first non-styrenic polypropylene polymer based on the total weight of the cap layer. In some embodiments, the cap layer comprises 10% to 50% by weight of the first non-styrenic polypropylene polymer based on the total weight of the cap layer. In some embodiments, the cap layer comprises 10% to 45% by weight of the first non-styrenic polypropylene polymer based on the total weight of the cap layer. In some embodiments, the cap layer comprises 10% to 40% by weight of the first non-styrenic polypropylene polymer based on the total weight of the cap layer. In some embodiments, the cap layer comprises 10% to 35% by weight of the first non-styrenic polypropylene polymer based on the total weight of the cap layer. In some embodiments, the cap layer comprises 10% to 30% by weight of the first non-styrenic polypropylene polymer based on the total weight of the cap layer. In some embodiments, the cap layer comprises 10% to 25% by weight of the first non-styrenic polypropylene polymer based on the total weight of the cap layer. In some embodiments, the cap layer comprises 10% to 20% by weight of the first non-styrenic polypropylene polymer based on the total weight of the cap layer.

In some embodiments, the cap layer comprises 15% to 90% by weight of the first non-styrenic polypropylene polymer based on the total weight of the cap layer. In some embodiments, the cap layer comprises 20% to 90% by weight of the first non-styrenic polypropylene polymer based on the total weight of the cap layer. In some embodiments, the cap layer comprises 25% to 90% by weight of the first non-styrenic polypropylene polymer based on the total weight of the cap layer. In some embodiments, the cap layer comprises 30% to 90% by weight of the first non-styrenic polypropylene polymer based on the total weight of the cap layer. In some embodiments, the cap layer comprises 35% to 90% by weight of the first non-styrenic polypropylene polymer based on the total weight of the cap layer. In some embodiments, the cap layer comprises 40% to 90% by weight of the first non-styrenic polypropylene polymer based on the total weight of the cap layer. In some embodiments, the cap layer comprises 45% to 90% by weight of the first non-styrenic polypropylene polymer based on the total weight of the cap layer. In some embodiments, the cap layer comprises 50% to 90% by weight of the first non-styrenic polypropylene polymer based on the total weight of the cap layer. In some embodiments, the cap layer comprises 55% to 90% by weight of the first non-styrenic polypropylene polymer based on the total weight of the cap layer. In some embodiments, the cap layer comprises 60% to 90% by weight of the first non-styrenic polypropylene polymer based on the total weight of the cap layer. In some embodiments, the cap layer comprises 65% to 90% by weight of the first non-styrenic polypropylene polymer based on the total weight of the cap layer. In some embodiments, the cap layer comprises 70% to 90% by weight of the first non-styrenic polypropylene polymer based on the total weight of the cap layer. In some embodiments, the cap layer comprises 75% to 90% by weight of the first non-styrenic polypropylene polymer based on the total weight of the cap layer. In some embodiments, the cap layer comprises 80% to 90% by weight of the first non-styrenic polypropylene polymer based on the total weight of the cap layer. In some embodiments, the cap layer comprises 90% to 90% by weight of the first non-styrenic polypropylene polymer based on the total weight of the cap layer.

In some embodiments, the cap layer comprises 20% to 70% by weight of the first non-styrenic polypropylene polymer based on the total weight of the cap layer. In some embodiments, the cap layer comprises 20% to 60% by weight of the first non-styrenic polypropylene polymer based on the total weight of the cap layer. In some embodiments, the cap layer comprises 20% to 55% by weight of the first non-styrenic polypropylene polymer based on the total weight of the cap layer. In some embodiments, the cap layer comprises 20% to 50% by weight of the first non-styrenic polypropylene polymer based on the total weight of the cap layer. In some embodiments, the cap layer comprises 20% to 45% by weight of the first non-styrenic polypropylene polymer based on the total weight of the cap layer. In some embodiments, the cap layer comprises 20% to 40% by weight of the first non-styrenic polypropylene polymer based on the total weight of the cap layer. In some embodiments, the cap layer comprises 20% to 35% by weight of the first non-styrenic polypropylene polymer based on the total weight of the cap layer. In some embodiments, the cap layer comprises 30% to 70% by weight of the first non-styrenic polypropylene polymer based on the total weight of the cap layer. In some embodiments, the cap layer comprises 30% to 60% by weight of the first non-styrenic polypropylene polymer based on the total weight of the cap layer. In some embodiments, the cap layer comprises 30% to 55% by weight of the first non-styrenic polypropylene polymer based on the total weight of the cap layer. In some embodiments, the cap layer comprises 40% to 70% by weight of the first non-styrenic polypropylene polymer based on the total weight of the cap layer. In some embodiments, the cap layer comprises 40% to 65% by weight of the first non-styrenic polypropylene polymer based on the total weight of the cap layer. In some embodiments, the cap layer comprises 40% to 60% by weight of the first non-styrenic polypropylene polymer based on the total weight of the cap layer. In some embodiments, the cap layer comprises 40% to 55% by weight of the first non-styrenic polypropylene polymer based on the total weight of the cap layer.

In some embodiments, the cap layer comprises a polypropylene impact copolymer. In some embodiments, the cap layer comprises a first polypropylene impact copolymer.

As used herein, the term "polypropylene impact copolymer" refers to a polypropylene copolymer comprising isotactic polypropylene units. In some embodiments, the first polypropylene impact copolymer is a block copolymer comprising isotactic polypropylene units. In some embodiments, the first polypropylene impact copolymer is not a random copolymer. For example, in some embodiments, the first polypropylene impact copolymer is not a propylene copolymer with random ethylene distribution. In some embodiments, the first polypropylene impact copolymer is a di-block copolymer, a tri-block copolymer, or a multi-block copolymer having more than three blocks. In some embodiments, the first polypropylene impact copolymer comprises, in addition to the isotactic polypropylene units, olefin units. In some embodiments, the olefin units comprise or is selected from the group consisting of ethylene, 1-butene, 2-butene, isobutylene, 1-pentene, 2-pentene, 2-methyl-1-butene, 3-methyl-1-butene, 2-methyl-2-butene, 1-hexene, 2-hexene, 3-hexene, methylpentene, dimethylbutane, or any combination thereof. In some embodiments, the first polypropylene impact copolymer comprises polypropylene and ethylene. In some embodiments, the first polypropylene impact copolymer is not, or is different from, the first non-styrenic polypropylene polymer. In some embodiments, the first polypropylene impact copolymer is not, or is different from, the first olefin block copolymer.

In some embodiments, the cap layer comprises 10% to 99% by weight of the first polypropylene impact copolymer based on the total weight of the cap layer. In some embodiments, the cap layer comprises 10% to 95% by weight of the first polypropylene impact copolymer based on the total weight of the cap layer. In some embodiments, the cap layer comprises 10% to 90% by weight of the first polypropylene impact copolymer based on the total weight of the cap layer. In some embodiments, the cap layer comprises 10% to 85% by weight of the first polypropylene impact copolymer based on the total weight of the cap layer. In some embodiments, the cap layer comprises 10% to 80% by weight of the first polypropylene impact copolymer based on the total weight of the cap layer. In some embodiments, the cap layer comprises 10% to 75% by weight of the first polypropylene impact copolymer based on the total weight of the cap layer. In some embodiments, the cap layer comprises 10% to 70% by weight of the first polypropylene impact copolymer based on the total weight of the cap layer. In some embodiments, the cap layer comprises 10% to 65% by weight of the first polypropylene impact copolymer based on the total weight of the cap layer. In some embodiments, the cap layer comprises 10% to 60% by weight of the first polypropylene impact copolymer based on the total weight of the cap layer. In some embodiments, the cap layer comprises 10% to 55% by weight of the first polypropylene impact copolymer based on the total weight of the cap layer. In some embodiments, the cap layer comprises 10% to 50% by weight of the first polypropylene impact copolymer based on the total weight of the cap layer. In some embodiments, the cap layer comprises 10% to 45% by weight of the first polypropylene impact copolymer based on the total weight of the cap layer. In some embodiments, the cap layer comprises 10% to 40% by weight of the first polypropylene impact copolymer based on the total weight of the cap layer. In some embodiments, the cap layer comprises 10% to 35% by weight of the first polypropylene impact copolymer based on the total weight of the cap layer. In some embodiments, the cap layer comprises 10% to 30% by weight of the first polypropylene impact copolymer based on the total weight of the cap layer. In some embodiments, the cap layer comprises 10% to 25% by weight of the first polypropylene impact copolymer based on the total weight of the cap layer. In some embodiments, the cap layer comprises 10% to 20% by weight of the first polypropylene impact copolymer based on the total weight of the cap layer.

In some embodiments, the cap layer comprises 15% to 90% by weight of the first polypropylene impact copolymer based on the total weight of the cap layer. In some embodiments, the cap layer comprises 20% to 90% by weight of the first polypropylene impact copolymer based on the total weight of the cap layer. In some embodiments, the cap layer comprises 25% to 90% by weight of the first polypropylene impact copolymer based on the total weight of the cap layer. In some embodiments, the cap layer comprises 30% to 90% by weight of the first polypropylene impact copolymer based on the total weight of the cap layer. In some embodiments, the cap layer comprises 35% to 90% by weight of the first polypropylene impact copolymer based on the total weight of the cap layer. In some embodiments, the cap layer comprises 40% to 90% by weight of the first polypropylene impact copolymer based on the total weight of the cap layer. In some embodiments, the cap layer comprises 45% to 90% by weight of the first polypropylene impact copolymer based on the total weight of the cap layer. In some embodiments, the cap layer comprises 50% to 90% by weight of the first polypropylene impact copolymer based on the total weight of the cap layer. In some embodiments, the cap layer comprises 55% to 90% by weight of the first polypropylene impact copolymer based on the total weight of the cap layer. In some embodiments, the cap layer comprises 60% to 90% by weight of the first polypropylene impact copolymer based on the total weight of the cap layer. In some embodiments, the cap layer comprises 65% to 90% by weight of the first polypropylene impact copolymer based on the total weight of the cap layer. In some embodiments, the cap layer comprises 70% to 90% by weight of the first polypropylene impact copolymer based on the total weight of the cap layer. In some embodiments, the cap layer comprises 75% to 90% by weight of the first polypropylene impact copolymer based on the total weight of the cap layer. In some embodiments, the cap layer comprises 80% to 90% by weight of the first polypropylene impact copolymer based on the total weight of the cap layer. In some embodiments, the cap layer comprises 90% to 90% by weight of the first polypropylene impact copolymer based on the total weight of the cap layer.

In some embodiments, the cap layer comprises 20% to 70% by weight of the first polypropylene impact copolymer based on the total weight of the cap layer. In some embodiments, the cap layer comprises 20% to 60% by weight of the first polypropylene impact copolymer based on the total weight of the cap layer. In some embodiments, the cap layer comprises 20% to 55% by weight of the first polypropylene impact copolymer based on the total weight of the cap layer. In some embodiments, the cap layer comprises 20% to 50% by weight of the first polypropylene impact copolymer based on the total weight of the cap layer. In some embodiments, the cap layer comprises 20% to 45% by weight of the first polypropylene impact copolymer based on the total weight of the cap layer. In some embodiments, the cap layer comprises 20% to 40% by weight of the first polypropylene impact copolymer based on the total weight of the cap layer. In some embodiments, the cap layer comprises 20% to 35% by weight of the first polypropylene impact copolymer based on the total weight of the cap layer. In some embodiments, the cap layer comprises 30% to 70% by weight of the first polypropylene impact copolymer based on the total weight of the cap layer. In some embodiments, the cap layer comprises 30% to 60% by weight of the first polypropylene impact copolymer based on the total weight of the cap layer. In some embodiments, the cap layer comprises 30% to 55% by weight of the first polypropylene impact copolymer based on the total weight of the cap layer. In some embodiments, the cap layer comprises 40% to 70% by weight of the first polypropylene impact copolymer based on the total weight of the cap layer. In some embodiments, the cap layer comprises 40% to 65% by weight of the first polypropylene impact copolymer based on the total weight of the cap layer. In some embodiments, the cap layer comprises 40% to 60% by weight of the first polypropylene impact copolymer based on the total weight of the cap layer. In some embodiments, the cap layer comprises 40% to 55% by weight of the first polypropylene impact copolymer based on the total weight of the cap layer.

In some embodiments, the cap layer comprises an olefin block copolymer. In some embodiments, the cap layer comprises a first olefin block copolymer.

As used herein, the term "olefin block copolymer" refers to a block copolymer comprising at least two polymer blocks, wherein at least one of the at least two polymer blocks is an olefin block. For example, in some embodiments, the first olefin block copolymer comprises a first olefin block and a second olefin block which is different from the first olefin block. In some embodiments, the olefin block comprises an alpha-olefin.

In some embodiments, the first olefin block copolymer comprises or is selected from the group consisting of at least one of straight-chain olefins, branched-chain olefins, cycloolefins, polyolefins, or any combination thereof. In some embodiments, the first olefin block copolymer comprises or is selected from the group consisting of ethylene, propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicosene, 1-docosene, 1-tetracosene, 1-hexacosene, 1-octacosene, 1-triacontene, cyclopentene, cycloheptene, norbornene, 5-methyl-2-norbornene, tetracyclododecene, 2-methyl-1,4,5,8-dimethano-1,2,3,4,4a, 5,8,8a-octahydronaphthalene, butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, 5,9-dimethyl-1,4,8-decatriene; 3-phenylpropene, 4-phenylpropene, 1,2-difluoroethylene, tetrafluoroethylene, 3,3,3-trifluoro-1-propene, or any combination thereof.

In some embodiments, the first olefin block copolymer comprises or is selected from the group consisting of at least one of ethylene-1-octene copolymer, propylene-ethylene copolymer, ethylene-1-butene copolymer, propylene-ethylene-1-butene copolymer, ethylene-1-hexene copolymer, ethylene-1-octene copolymer, ethylene-1-hexene-1-octene copolymer, propylene-ethylene-1-hexene copolymer, propylene-ethylene-1-octene copolymer, ethylene-1-butene-1-octene copolymer, or any combination thereof. In some embodiments, the first olefin block copolymer comprises or is selected from the group consisting of at least one of propylene-ethylene copolymer, ethylene-1-octene copolymer, propylene-ethylene 1-butene copolymer, propylene-ethylene-1-hexene copolymer, propylene-ethylene-1-octene copolymer, ethylene-1-butene-1-octene copolymer, or any combination thereof.

In some embodiments, the cap layer comprises 1% to 10% by weight of the first olefin block copolymer based on the total weight of the cap layer. In some embodiments, the cap layer comprises less than 10% by weight of the first olefin block copolymer based on the total weight of the cap layer. In some embodiments, the cap layer comprises 1% to 9.8% by weight of the first olefin block copolymer based on the total weight of the cap layer. In some embodiments, the cap layer comprises 1% to 9.6% by weight of the first olefin block copolymer based on the total weight of the cap layer. In some embodiments, the cap layer comprises 1% to 9.5% by weight of the first olefin block copolymer based on the total weight of the cap layer. In some embodiments, the cap layer comprises 1% to 9.4% by weight of the first olefin block copolymer based on the total weight of the cap layer. In some embodiments, the cap layer comprises 1% to 9.2% by weight of the first olefin block copolymer based on the total weight of the cap layer. In some embodiments, the cap layer comprises 1% to 9% by weight of the first olefin block copolymer based on the total weight of the cap layer. In some embodiments, the cap layer comprises 1% to 8% by weight of the first olefin block copolymer based on the total weight of the cap layer. In some embodiments, the cap layer comprises 1% to 7% by weight of the first olefin block copolymer based on the total weight of the cap layer. In some embodiments, the cap layer comprises 1% to 6% by weight of the first olefin block copolymer based on the total weight of the cap layer. In some embodiments, the cap layer comprises 1% to 5% by weight of the first olefin block copolymer based on the total weight of the cap layer. In some embodiments, the cap layer comprises 1% to 4% by weight of the first olefin block copolymer.

In some embodiments, the cap layer comprises 2% to 10% by weight of the first olefin block copolymer based on the total weight of the cap layer. In some embodiments, the cap layer comprises 3% to 10% by weight of the first olefin block copolymer based on the total weight of the cap layer. In some embodiments, the cap layer comprises 4% to 10% by weight of the first olefin block copolymer based on the total weight of the cap layer. In some embodiments, the cap layer comprises 5% to 10% by weight of the first olefin block copolymer based on the total weight of the cap layer. In some embodiments, the cap layer comprises 6% to 10% by weight of the first olefin block copolymer based on the total weight of the cap layer. In some embodiments, the cap layer comprises 7% to 10% by weight of the first olefin block copolymer based on the total weight of the cap layer. In some embodiments, the cap layer comprises 1% to 9% by weight of the first olefin block copolymer based on the total weight of the cap layer. In some embodiments, the cap layer comprises 2% to 9% by weight of the first olefin block copolymer based on the total weight of the cap layer. In some embodiments, the cap layer comprises 1% to 8% by weight of the first olefin block copolymer based on the total weight of the cap layer. In some embodiments, the cap layer comprises 2% to 8% by weight of the first olefin block copolymer.

In some embodiments, the cap layer comprises a polypropylene elastomer. In some embodiments, the polypropylene elastomer comprises a first polypropylene elastomer.

As used herein, the term "polypropylene elastomer" refers to an elastomer comprising at least 50% by weight (or mole percent) of polypropylene based on a total weight (or total moles) of the elastomer. In some embodiments, the polypropylene elastomer comprises a random polypropylene copolymer comprising polypropylene units with random distribution of olefin units, such as, for example, alpha-olefin units. In some embodiments, the olefin units comprise or are selected from the group consisting of at least one of ethylene, 1-butene, 1-pentene, 1-hexene, 1-octene, 1-decene, 1-dodecene, 1-tetradecene, 1-hexadecene, 1-octadecene, 1-eicosene, 1-docosene, 1-tetracosene, 1-hexacosene, 1-octacosene, 1-triacontene, or any combination thereof.

In some embodiments, the cap layer comprises 1% to 10% by weight of the first polypropylene elastomer based on the total weight of the cap layer. In some embodiments, the cap layer comprises 1% to 9.8% by weight of the first polypropylene elastomer based on the total weight of the cap layer. In some embodiments, the cap layer comprises 1% to 9.6% by weight of the first polypropylene elastomer based on the total weight of the cap layer. In some embodiments, the cap layer comprises 1% to 9.5% by weight of the first polypropylene elastomer based on the total weight of the cap layer. In some embodiments, the cap layer comprises 1% to 9.4% by weight of the first polypropylene elastomer based on the total weight of the cap layer. In some embodiments, the cap layer comprises 1% to 9.2% by weight of the first polypropylene elastomer based on the total weight of the cap layer. In some embodiments, the cap layer comprises 1% to 9% by weight of the first polypropylene elastomer based on the total weight of the cap layer. In some embodiments, the cap layer comprises 1% to 8% by weight of the first polypropylene elastomer based on the total weight of the cap layer. In some embodiments, the cap layer comprises 1% to 7% by weight of the first polypropylene elastomer based on the total weight of the cap layer. In some embodiments, the cap layer comprises 1% to 6% by weight of the first polypropylene elastomer based on the total weight of the cap layer. In some embodiments, the cap layer comprises 1% to 5% by weight of the first polypropylene elastomer based on the total weight of the cap layer. In some embodiments, the cap layer comprises 1% to 4% by weight of the first polypropylene elastomer.

In some embodiments, the cap layer comprises 2% to 10% by weight of the first polypropylene elastomer based on the total weight of the cap layer. In some embodiments, the cap layer comprises 3% to 10% by weight of the first polypropylene elastomer based on the total weight of the cap layer. In some embodiments, the cap layer comprises 4% to 10% by weight of the first polypropylene elastomer based on the total weight of the cap layer. In some embodiments, the cap layer comprises 5% to 10% by weight of the first polypropylene elastomer based on the total weight of the cap layer. In some embodiments, the cap layer comprises 6% to 10% by weight of the first polypropylene elastomer based on the total weight of the cap layer. In some embodiments, the cap layer comprises 7% to 10% by weight of the first polypropylene elastomer based on the total weight of the cap layer. In some embodiments, the cap layer comprises 1% to 9% by weight of the first polypropylene elastomer based on the total weight of the cap layer. In some embodiments, the cap layer comprises 2% to 9% by weight of the first polypropylene elastomer based on the total weight of the cap layer. In some embodiments, the cap layer comprises 1% to 8% by weight of the first polypropylene elastomer based on the total weight of the cap layer. In some embodiments, the cap layer comprises 2% to 8% by weight of the first polypropylene elastomer.

In some embodiments, a weight ratio of the first polypropylene impact copolymer to the first non-styrenic polypropylene polymer is 1:1 to 1:15. In some embodiments, a weight ratio of the first polypropylene impact copolymer to the first non-styrenic polypropylene polymer is 1:1 to 1:14. In some embodiments, a weight ratio of the first polypropylene impact copolymer to the first non-styrenic polypropylene polymer is 1:1 to 1:13. In some embodiments, a weight ratio of the first polypropylene impact copolymer to the first non-styrenic polypropylene polymer is 1:1 to 1:12. In some embodiments, a weight ratio of the first polypropylene impact copolymer to the first non-styrenic polypropylene polymer is 1:1 to 1:11. In some embodiments, a weight ratio of the first polypropylene impact copolymer to the first non-styrenic polypropylene polymer is 1:1 to 1:10. In some embodiments, a weight ratio of the first polypropylene impact copolymer to the first non-styrenic polypropylene polymer is 1:2 to 1:14. In some embodiments, a weight ratio of the first polypropylene impact copolymer to the first non-styrenic polypropylene polymer is 1:2 to 1:13.

In some embodiments, a weight ratio of the first polypropylene impact copolymer to the first non-styrenic polypropylene polymer is 1:1 to 1:9. In some embodiments, a weight ratio of the first polypropylene impact copolymer to the first non-styrenic polypropylene polymer is 1:1 to 1:8. In some embodiments, a weight ratio of the first polypropylene impact copolymer to the first non-styrenic polypropylene polymer is 1:1 to 1:7. In some embodiments, a weight ratio of the first polypropylene impact copolymer to the first non-styrenic polypropylene polymer is 1:1 to 1:6. In some embodiments, a weight ratio of the first polypropylene impact copolymer to the first non-styrenic polypropylene polymer is 1:1 to 1:5. In some embodiments, a weight ratio of the first polypropylene impact copolymer to the first non-styrenic polypropylene polymer is 1:1 to 1:4. In some embodiments, a weight ratio of the first polypropylene impact copolymer to the first non-styrenic polypropylene polymer is 1:1 to 1:3. In some embodiments, a weight ratio of the first polypropylene impact copolymer to the first non-styrenic polypropylene polymer is 1:2 to 1:4.

In some embodiments, a weight ratio of the first olefin block copolymer to the first non-styrenic polypropylene polymer is 1:1 to 1:10. In some embodiments, a weight ratio of the first olefin block copolymer to the first non-styrenic polypropylene polymer is 1:2 to 1:10. In some embodiments, a weight ratio of the first olefin block copolymer to the first non-styrenic polypropylene polymer is 1:3 to 1:10. In some embodiments, a weight ratio of the first olefin block copolymer to the first non-styrenic polypropylene polymer is 1:4 to 1:10. In some embodiments, a weight ratio of the first olefin block copolymer to the first non-styrenic polypropylene polymer is 1:5 to 1:10. In some embodiments, a weight ratio of the first olefin block copolymer to the first non-styrenic polypropylene polymer is 1:6 to 1:10. In some embodiments, a weight ratio of the first olefin block copolymer to the first non-styrenic polypropylene polymer is 1:7 to 1:10. In some embodiments, a weight ratio of the first olefin block copolymer to the first non-styrenic polypropylene polymer is 1:8 to 1:10. In some embodiments, a weight ratio of the first olefin block copolymer to the first non-styrenic polypropylene polymer is 1:1 to 1:9. In some embodiments, a weight ratio of the first olefin block copolymer to the first non-styrenic polypropylene polymer is 1:1 to 1:8. In some embodiments, a weight ratio of the first olefin block copolymer to the first non-styrenic polypropylene polymer is 1:1 to 1:7. In some embodiments, a weight ratio of the first olefin block copolymer to the first non-styrenic polypropylene polymer is 1:1 to 1:6. In some embodiments, a weight ratio of the first olefin block copolymer to the first non-styrenic polypropylene polymer is 1:1 to 1:5. In some embodiments, a weight ratio of the first olefin block copolymer to the first non-styrenic polypropylene polymer is 1:1 to 1:4. In some embodiments, a weight ratio of the first olefin block copolymer to the first non-styrenic polypropylene polymer is 1:1 to 1:3. In some embodiments, a weight ratio of the first olefin block copolymer to the first non-styrenic polypropylene polymer is 1:2 to 1:9. In some embodiments, a weight ratio of the first olefin block copolymer to the first non-styrenic polypropylene polymer is 1:3 to 1:8. In some embodiments, a weight ratio of the first olefin block copolymer to the first non-styrenic polypropylene polymer is 1:4 to 1:7. In some embodiments, a weight ratio of the first olefin block copolymer to the first non-styrenic polypropylene polymer is less than 3. In some embodiments, a weight ratio of the first olefin block copolymer to the first non-styrenic polypropylene polymer is from 0.1 to 2. In some embodiments, a weight ratio of the first olefin block copolymer to the first non-styrenic polypropylene polymer is from 0.1 to 1.

In some embodiments, a weight ratio of the first polypropylene impact copolymer to the first olefin block copolymer is 1:100 to 1:2 and/or 2:1 to 100:1. In some embodiments, a weight ratio of the first polypropylene impact copolymer to the first olefin block copolymer is 1:100 to 1:2.1 and/or 2.1:1 to 100:1. In some embodiments, a weight ratio of the first polypropylene impact copolymer to the first olefin block copolymer is 1:100 to 1:2.2 and/or 2.2:1 to 100:1. In some embodiments, a weight ratio of the first polypropylene impact copolymer to the first olefin block copolymer is 1:100 to 1:2.3 and/or 2.3:1 to 100:1. In some embodiments, a weight ratio of the first polypropylene impact copolymer to the first olefin block copolymer is 1:100 to 1:2.4 and/or 2.4:1 to 100:1. In some embodiments, a weight ratio of the first polypropylene impact copolymer to the first olefin block copolymer is 1:100 to 1:2.5 and/or 2.5:1 to 100:1. In some embodiments, a weight ratio of the first polypropylene impact copolymer to the first olefin block copolymer is 1:100 to 1:2.6 and/or 2.6:1 to 100:1. In some embodiments, a weight ratio of the first polypropylene impact copolymer to the first olefin block copolymer is 1:100 to 1:2.7 and/or 2.7:1 to 100:1. In some embodiments, a weight ratio of the first polypropylene impact copolymer to the first olefin block copolymer is 1:100 to 1:2.8 and/or 2.8:1 to 100:1. In some embodiments, a weight ratio of the first polypropylene impact copolymer to the first olefin block copolymer is 1:100 to 1:2.9 and/or 2.9:1 to 100:1. In some embodiments, a weight ratio of the first polypropylene impact copolymer to the first olefin block copolymer is 1:100 to 1:3 and/or 3:1 to 100:1.

In some embodiments, a weight ratio of the first polypropylene impact copolymer to the first polypropylene elastomer is 1:100 to 1:2 and/or 2:1 to 100:1. In some embodiments, a weight ratio of the first polypropylene impact copolymer to the first polypropylene elastomer is 1:100 to 1:2.1 and/or 2.1:1 to 100:1. In some embodiments, a weight ratio of the first polypropylene impact copolymer to the first polypropylene elastomer is 1:100 to 1:2.2 and/or 2.2:1 to 100:1. In some embodiments, a weight ratio of the first polypropylene impact copolymer to the first polypropylene elastomer is 1:100 to 1:2.3 and/or 2.3:1 to 100:1. In some embodiments, a weight ratio of the first polypropylene impact copolymer to the first polypropylene elastomer is 1:100 to 1:2.4 and/or 2.4:1 to 100:1. In some embodiments, a weight ratio of the first polypropylene impact copolymer to the first polypropylene elastomer is 1:100 to 1:2.5 and/or 2.5:1 to 100:1. In some embodiments, a weight ratio of the first polypropylene impact copolymer to the first polypropylene elastomer is 1:100 to 1:2.6 and/or 2.6:1 to 100:1. In some embodiments, a weight ratio of the first polypropylene impact copolymer to the first polypropylene elastomer is 1:100 to 1:2.7 and/or 2.7:1 to 100:1. In some embodiments, a weight ratio of the first polypropylene impact copolymer to the first polypropylene elastomer is 1:100 to 1:2.8 and/or 2.8:1 to 100:1. In some embodiments, a weight ratio of the first polypropylene impact copolymer to the first polypropylene elastomer is 1:100 to 1:2.9 and/or 2.9:1 to 100:1. In some embodiments, a weight ratio of the first polypropylene impact copolymer to the first polypropylene elastomer is 1:100 to 1:3 and/or 3:1 to 100:1.

In some embodiments, the cap layer has a thickness of 10 mil to 45 mil. In some embodiments, the cap layer has a thickness of 10 mil to 44 mil. In some embodiments, the cap layer has a thickness of 10 mil to 42 mil. In some embodiments, the cap layer has a thickness of 10 mil to 40 mil. In some embodiments, the cap layer has a thickness of 10 mil to 38 mil. In some embodiments, the cap layer has a thickness of 10 mil to 36 mil. In some embodiments, the cap layer has a thickness of 10 mil to 35 mil. In some embodiments, the cap layer has a thickness of 10 mil to 34 mil. In some embodiments, the cap layer has a thickness of 10 mil to 32 mil. In some embodiments, the cap layer has a thickness of 10 mil to 30 mil. In some embodiments, the cap layer has a thickness of 10 mil to 28 mil. In some embodiments, the cap layer has a thickness of 10 mil to 26 mil. In some embodiments, the cap layer has a thickness of 10 mil to 25 mil. In some embodiments, the cap layer has a thickness of 10 mil to 24 mil. In some embodiments, the cap layer has a thickness of 10 mil to 22 mil. In some embodiments, the cap layer has a thickness of 10 mil to 20 mil. In some embodiments, the cap layer has a thickness of 10 mil to 18 mil. In some embodiments, the cap layer has a thickness of 10 mil to 16 mil. In some embodiments, the cap layer has a thickness of 10 mil to 15 mil.

In some embodiments, the cap layer has a thickness of 12 mil to 45 mil. In some embodiments, the cap layer has a thickness of 14 mil to 45 mil. In some embodiments, the cap layer has a thickness of 15 mil to 45 mil. In some embodiments, the cap layer has a thickness of 16 mil to 45 mil. In some embodiments, the cap layer has a thickness of 18 mil to 45 mil. In some embodiments, the cap layer has a thickness of 20 mil to 45 mil. In some embodiments, the cap layer has a thickness of 22 mil to 45 mil. In some embodiments, the cap layer has a thickness of 24 mil to 45 mil. In some embodiments, the cap layer has a thickness of 25 mil to 45 mil. In some embodiments, the cap layer has a thickness of 26 mil to 45 mil. In some embodiments, the cap layer has a thickness of 28 mil to 45 mil. In some embodiments, the cap layer has a thickness of 30 mil to 45 mil. In some embodiments, the cap layer has a thickness of 32 mil to 45 mil. In some embodiments, the cap layer has a thickness of 34 mil to 45 mil. In some embodiments, the cap layer has a thickness of 35 mil to 45 mil. In some embodiments, the cap layer has a thickness of 36 mil to 45 mil. In some embodiments, the cap layer has a thickness of 38 mil to 45 mil. In some embodiments, the cap layer has a thickness of 40 mil to 45 mil. In some embodiments, the cap layer has a thickness of 10 mil to 30 mil. In some embodiments, the cap layer has a thickness of 20 mil to 30 mil.

In some embodiments, the cap layer comprises at least one filler. In some embodiments, the at least one filler may comprise, consist of, or consist essentially of at least one of limestone, glass, calcium carbonate, barium sulfate, calcium sulfate, talc, perlite, silica, fumed silica, precipitated silica, quartz, aluminum trihydrate, magnesium hydroxide, ammonium polyphosphate, colemanite, titanium dioxide, calcium sulfate, fly ash, graphene nanoparticles, carbon black, recycled materials (e.g., such as one or more of recycled rubber tires, recycled shingles, recycled thermoplastic resins), basalt, roofing granules, graphite, clay, or any combination thereof. In some embodiments, the at least one filler comprises at least one additive. In some embodiments, the at least one additive comprises or is selected from the group stabilizers, antioxidants, colorants, nucleating agents, mold release agents, dispersing agents, UV light absorbers, flame retardants, coloring agents, mold release agents, anti-static agents, pigments, or any combination thereof.

In some embodiments, the cap layer comprises 1% to 60% by weight of the at least one filler based on the total weight of the cap layer. In some embodiments, the cap layer comprises 1% to 55% by weight of the at least one filler based on the total weight of the cap layer. In some embodiments, the cap layer comprises 1% to 50% by weight of the at least one filler based on the total weight of the cap layer based on the total weight of the cap layer. In some embodiments, the cap layer comprises 1% to 45% by weight of the at least one filler based on the total weight of the cap layer. In some embodiments, the cap layer comprises 1% to 40% by weight of the at least one filler based on the total weight of the cap layer. In some embodiments, the cap layer comprises 1% to 35% by weight of the at least one filler based on the total weight of the cap layer. In some embodiments, the cap layer comprises 1% to 30% by weight of the at least one filler based on the total weight of the cap layer. In some embodiments, the cap layer comprises 1% to 25% by weight of the at least one filler based on the total weight of the cap layer. In some embodiments, the cap layer comprises 1% to 20% by weight of the at least one filler based on the total weight of the cap layer. In some embodiments, the cap layer comprises 1% to 15% by weight of the at least one filler based on the total weight of the cap layer. In some embodiments, the cap layer comprises 1% to 10% by weight of the at least one filler based on the total weight of the cap layer. In some embodiments, the cap layer comprises 1% to 5% by weight of the at least one filler.

In some embodiments, the cap layer comprises 5% to 60% by weight of the at least one filler based on the total weight of the cap layer. In some embodiments, the cap layer comprises 10% to 60% by weight of the at least one filler based on the total weight of the cap layer. In some embodiments, the cap layer comprises 15% to 60% by weight of the at least one filler based on the total weight of the cap layer. In some embodiments, the cap layer comprises 20% to 60% by weight of the at least one filler based on the total weight of the cap layer. In some embodiments, the cap layer comprises 25% to 60% by weight of the at least one filler based on the total weight of the cap layer. In some embodiments, the cap layer comprises 30% to 60% by weight of the at least one filler based on the total weight of the cap layer. In some embodiments, the cap layer comprises 35% to 60% by weight of the at least one filler based on the total weight of the cap layer. In some embodiments, the cap layer comprises 40% to 60% by weight of the at least one filler based on the total weight of the cap layer. In some embodiments, the cap layer comprises 45% to 60% by weight of the at least one filler based on the total weight of the cap layer. In some embodiments, the cap layer comprises 10% to 40% by weight of the at least one filler based on the total weight of the cap layer. In some embodiments, the cap layer comprises 10% to 30% by weight of the at least one filler based on the total weight of the cap layer. In some embodiments, the cap layer comprises 2% to 10% by weight of the at least one filler based on the total weight of the cap layer. In some embodiments, the cap layer comprises 2% to 8% by weight of the at least one filler based on the total weight of the cap layer.

In some embodiments, the roofing membrane comprises a core layer. In some embodiments, the core layer is disposed on the bottom surface of the scrim. In some embodiments, the core layer is disposed on the scrim, in direct contact with the bottom surface of the scrim. That is, in some embodiments, no intermediate layer is disposed between the core layer and the scrim. In some embodiments, an intermediate layer is disposed between the core layer and the scrim. In some embodiments, the core layer comprises one or more sublayers. For example, in some embodiments, the core layer comprises at least one of a first sublayer, a second sublayer, a third sublayer, a fourth sublayer, a fifth sublayer, a sixth sublayer, a seventh sublayer, an eighth sublayer, a ninth sublayer, a tenth sublayer, or any combination thereof.

In some embodiments, the core layer comprises a non-styrenic polypropylene polymer. In some embodiments, the core layer comprises a second non-styrenic polypropylene polymer.

In some embodiments, the second non-styrenic polypropylene polymer comprises, consists of, or consists essentially of at least one of a polypropylene homopolymer, a polypropylene copolymer, or any combination thereof. In some embodiments, the polypropylene homopolymer comprises, consists of, or consists essentially of at least one of an isotactic polypropylene homopolymer, a syndiotactic polypropylene homopolymer, an atactic polypropylene homopolymer, or any combination thereof. In some embodiments, the polypropylene copolymer comprises, consists of, or consists essentially of at least one of a statistical polypropylene copolymer, a random polypropylene copolymer, a polypropylene block copolymer, or any combination thereof. In some embodiments, the polypropylene copolymer does not comprise isotactic polypropylene units. In some embodiments, the second non-styrenic polypropylene polymer is not, or is different from, a polypropylene impact copolymer. In some embodiments, the second non-styrenic polypropylene polymer is not, or is different from, an olefin block copolymer. In some embodiments, the polypropylene copolymer comprises polypropylene units and ethylene units.

In some embodiments, the second non-styrenic polypropylene polymer is a second non-styrenic polypropylene copolymer. In some embodiments, the second non-styrenic polypropylene copolymer comprises 50% to 100% by weight (or mole percent) of polymer units derived from propylene based on the total weight (or total moles) of the second non-styrenic polypropylene copolymer. In some embodiments, the second non-styrenic polypropylene copolymer comprises 50% to 95% by weight (or mole percent) of polymer units derived from propylene based on the total weight (or total moles) of the second non-styrenic polypropylene copolymer. In some embodiments, the second non-styrenic polypropylene copolymer comprises 50% to 90% by weight (or mole percent) of polymer units derived from propylene based on the total weight (or total moles) of the second non-styrenic polypropylene copolymer. In some embodiments, the second non-styrenic polypropylene copolymer comprises 50% to 80% by weight (or mole percent) of polymer units derived from propylene based on the total weight (or total moles) of the second non-styrenic polypropylene copolymer. In some embodiments, the second non-styrenic polypropylene copolymer comprises 50% to 70% by weight (or mole percent) of polymer units derived from propylene based on the total weight (or total moles) of the second non-styrenic polypropylene copolymer. In some embodiments, the second non-styrenic polypropylene copolymer comprises 50% to 60% by weight (or mole percent) of polymer units derived from propylene based on the total weight (or total moles) of the second non-styrenic polypropylene copolymer. In some embodiments, the second non-styrenic polypropylene copolymer comprises 60% to 99% by weight (or mole percent) of polymer units derived from propylene based on the total weight (or total moles) of the second non-styrenic polypropylene copolymer. In some embodiments, the second non-styrenic polypropylene copolymer comprises 70% to 99% by weight (or mole percent) of polymer units derived from propylene based on the total weight (or total moles) of the second non-styrenic polypropylene copolymer. In some embodiments, the second non-styrenic polypropylene copolymer comprises 80% to 99% by weight (or mole percent) of polymer units derived from propylene based on the total weight (or total moles) of the second non-styrenic polypropylene copolymer. In some embodiments, the weight percent (or mole percent) is based on the total weight (or total moles) of the second non-styrenic polypropylene copolymer based on the total weight (or total moles) of the second non-styrenic polypropylene copolymer.

In some embodiments, the second non-styrenic polypropylene copolymer comprises polymer units derived from ethylene. In some embodiments, the second non-styrenic polypropylene copolymer comprises less than 50% by weight (or mole percent) of polymer units derived from ethylene based on the total weight (or total moles) of the second non-styrenic polypropylene copolymer. In some embodiments, the second non-styrenic polypropylene copolymer comprises 1% to 49% by weight (or mole percent) of polymer units derived from ethylene based on the total weight (or total moles) of the second non-styrenic polypropylene copolymer. In some embodiments, the second non-styrenic polypropylene copolymer comprises 5% to 49% by weight (or mole percent) of polymer units derived from ethylene based on the total weight (or total moles) of the second non-styrenic polypropylene copolymer. In some embodiments, the second non-styrenic polypropylene copolymer comprises 10% to 49% by weight (or mole percent) of polymer units derived from ethylene based on the total weight (or total moles) of the second non-styrenic polypropylene copolymer. In some embodiments, the second non-styrenic polypropylene copolymer comprises 15% to 49% by weight (or mole percent) of polymer units derived from ethylene based on the total weight (or total moles) of the second non-styrenic polypropylene copolymer. In some embodiments, the second non-styrenic polypropylene copolymer comprises 20% to 49% by weight (or mole percent) of polymer units derived from ethylene based on the total weight (or total moles) of the second non-styrenic polypropylene copolymer. In some embodiments, the second non-styrenic polypropylene copolymer comprises 25% to 49% by weight (or mole percent) of polymer units derived from ethylene based on the total weight (or total moles) of the second non-styrenic polypropylene copolymer. In some embodiments, the second non-styrenic polypropylene copolymer comprises 30% to 49% by weight (or mole percent) of polymer units derived from ethylene based on the total weight (or total moles) of the second non-styrenic polypropylene copolymer. In some embodiments, the second non-styrenic polypropylene copolymer comprises 35% to 49% by weight (or mole percent) of polymer units derived from ethylene based on the total weight (or total moles) of the second non-styrenic polypropylene copolymer. In some embodiments, the second non-styrenic polypropylene copolymer comprises 40% to 49% by weight (or mole percent) of polymer units derived from ethylene based on the total weight (or total moles) of the second non-styrenic polypropylene copolymer.

In some embodiments, the second non-styrenic polypropylene copolymer comprises polymer units derived from monomers and/or polymers other than ethylene. In some embodiments, the second non-styrenic polypropylene copolymer comprises polymer units derived from olefins (other than ethylene). For example, in some embodiments, the second non-styrenic polypropylene copolymer comprises polymer units derived from alpha-olefins. In some embodiments, the alpha-olefins comprise at least one of $C_2$ alpha-olefins, $C_4$-$C_{20}$ alpha-olefins, or any combination thereof. In some embodiments, the second non-styrenic polypropylene copolymer comprises polymer units derived from at least one of $C_2$ alpha-olefins, $C_4$-$C_{20}$ alpha-olefins, $C_4$-$C_{18}$ alpha-olefins, $C_4$-$C_{20}$ alpha-olefins, $C_4$-$C_{16}$ alpha-olefins, $C_4$-$C_{14}$ alpha-olefins, $C_4$-$C_{12}$ alpha-olefins, $C_4$-$C_{10}$ alpha-olefins, $C_4$-$C_8$ alpha-olefins, $C_4$-$C_6$ alpha-olefins, $C_6$-$C_{20}$ alpha-olefins, $C_6$-$C_{18}$ alpha-olefins, $C_6$-$C_{16}$ alpha-olefins, $C_6$-$C_{14}$ alpha-olefins, $C_6$-$C_{12}$ alpha-olefins, $C_6$-$C_{10}$ alpha-olefins, $C_6$-$C_8$ alpha-olefins, $C_8$-$C_{20}$ alpha-olefins, $C_{10}$-$C_{20}$ alpha-olefins, $C_{10}$-$C_{12}$ alpha-olefins, $C_{10}$-$C_{16}$ alpha-olefins, $C_{10}$-$C_{18}$ alpha-olefins, $C_{20}$-$C_{30+}$ alpha-olefins, or any combination thereof. In some embodiments, the alpha-olefin comprises or is selected from the group consisting of at least one of 1-butene, 1-pentene, 1-hexene, 1-octene, 1-decene, 1-dodecene, 1-tetradecene, 1-hexadecene, 1-octadecene, 1-eicosene, 1-docosene, 1-tetracosene, 1-hexacosene, 1-octacosene, 1-triacontene, or any combination thereof.

In some embodiments, the core layer comprises 10% to 99% by weight of the second non-styrenic polypropylene polymer based on the total weight of the core layer. In some embodiments, the core layer comprises 10% to 95% by weight of the second non-styrenic polypropylene polymer based on the total weight of the core layer. In some embodiments, the core layer comprises 10% to 90% by weight of the second non-styrenic polypropylene polymer based on the total weight of the core layer. In some embodiments, the core layer comprises 10% to 85% by weight of the second non-styrenic polypropylene polymer based on the total weight of the core layer. In some embodiments, the core layer comprises 10% to 80% by weight of the second non-styrenic polypropylene polymer based on the total weight of the core layer. In some embodiments, the core layer comprises 10% to 75% by weight of the second non-styrenic polypropylene polymer based on the total weight of the core layer. In some embodiments, the core layer comprises 10% to 70% by weight of the second non-styrenic polypropylene polymer based on the total weight of the core layer. In some embodiments, the core layer comprises 10% to 65% by weight of the second non-styrenic polypropylene polymer based on the total weight of the core layer. In some embodiments, the core layer comprises 10% to 60% by weight of the second non-styrenic polypropylene polymer based on the total weight of the core layer. In some embodiments, the core layer comprises 10% to 55% by weight of the second non-styrenic polypropylene polymer based on the total weight of the core layer. In some embodiments, the core layer comprises 10% to 50% by weight of the second non-styrenic polypropylene polymer based on the total weight of the core layer. In some embodiments, the core layer comprises 10% to 45% by weight of the second non-styrenic polypropylene polymer based on the total weight of the core layer. In some embodiments, the core layer comprises 10% to 40% by weight of the second non-styrenic polypropylene polymer based on the total weight of the core layer. In some embodiments, the core layer comprises 10% to 35% by weight of the second non-styrenic polypropylene polymer based on the total weight of the core layer. In some embodiments, the core layer comprises 10% to 30% by weight of the second non-styrenic polypropylene polymer based on the total weight of the core layer. In some embodiments, the core layer comprises 10% to 25% by weight of the second non-styrenic polypropylene polymer based on the total weight of the core layer. In some embodiments, the core layer comprises 10% to 20% by weight of the second non-styrenic polypropylene polymer based on the total weight of the core layer.

In some embodiments, the core layer comprises 15% to 90% by weight of the second non-styrenic polypropylene polymer based on the total weight of the core layer. In some embodiments, the core layer comprises 20% to 90% by weight of the second non-styrenic polypropylene polymer based on the total weight of the core layer. In some embodiments, the core layer comprises 25% to 90% by weight of the second non-styrenic polypropylene polymer based on the total weight of the core layer. In some embodiments, the core layer comprises 30% to 90% by weight of the second non-styrenic polypropylene polymer based on the total weight of the core layer. In some embodiments, the core layer comprises 35% to 90% by weight of the second non-styrenic polypropylene polymer based on the total weight of the core layer. In some embodiments, the core layer comprises 40% to 90% by weight of the second non-styrenic polypropylene polymer based on the total weight of the core layer. In some embodiments, the core layer comprises 45% to 90% by weight of the second non-styrenic polypropylene polymer based on the total weight of the core layer. In some embodiments, the core layer comprises 50% to 90% by weight of the second non-styrenic polypropylene polymer based on the total weight of the core layer. In some embodiments, the core layer comprises 55% to 90% by weight of the second non-styrenic polypropylene polymer based on the total weight of the core layer. In some embodiments, the core layer comprises 60% to 90% by weight of the second non-styrenic polypropylene polymer based on the total weight of the core layer. In some embodiments, the core layer comprises 65% to 90% by weight of the second non-styrenic polypropylene polymer based on the total weight of the core layer. In some embodiments, the core layer comprises 70% to 90% by weight of the second non-styrenic polypropylene polymer based on the total weight of the core layer. In some embodiments, the core layer comprises 75% to 90% by weight of the second non-styrenic polypropylene polymer based on the total weight of the core layer. In some embodiments, the core layer comprises 80% to 90% by weight of the second non-styrenic polypropylene polymer based on the total weight of the core layer. In some embodiments, the core layer comprises 90% to 90% by weight of the second non-styrenic polypropylene polymer based on the total weight of the core layer.

In some embodiments, the core layer comprises 20% to 70% by weight of the second non-styrenic polypropylene polymer based on the total weight of the core layer. In some embodiments, the core layer comprises 20% to 60% by weight of the second non-styrenic polypropylene polymer based on the total weight of the core layer. In some embodiments, the core layer comprises 20% to 55% by weight of the second non-styrenic polypropylene polymer based on the total weight of the core layer. In some embodiments, the core layer comprises 20% to 50% by weight of the second non-styrenic polypropylene polymer based on the total weight of the core layer. In some embodiments, the core layer comprises 20% to 45% by weight of the second non-styrenic polypropylene polymer based on the total weight of the core layer. In some embodiments, the core layer comprises 20% to 40% by weight of the second non-styrenic polypropylene polymer based on the total weight of the core layer. In some embodiments, the core layer comprises 20% to 35% by weight of the second non-styrenic polypropylene polymer based on the total weight of the core layer. In some embodiments, the core layer comprises 30% to 70% by weight of the second non-styrenic polypropylene polymer based on the total weight of the core layer. In some embodiments, the core layer comprises 30% to 60% by weight of the second non-styrenic polypropylene polymer based on the total weight of the core layer. In some embodiments, the core layer comprises 30% to 55% by weight of the second non-styrenic polypropylene polymer based on the total weight of the core layer. In some embodiments, the core layer comprises 40% to 70% by weight of the second non-styrenic polypropylene polymer based on the total weight of the core layer. In some embodiments, the core layer comprises 40% to 65% by weight of the second non-styrenic polypropylene polymer based on the total weight of the core layer. In some embodiments, the core layer comprises 40% to 60% by weight of the second non-styrenic polypropylene polymer based on the total weight of the core layer. In some embodiments, the core layer comprises 40% to 55% by weight of the second non-styrenic polypropylene polymer based on the total weight of the core layer.

In some embodiments, the core layer comprises an impact polypropylene copolymer. In some embodiments, the core layer comprises a second impact polypropylene copolymer.

In some embodiments, the second polypropylene impact copolymer is a block copolymer comprising isotactic polypropylene units. In some embodiments, the second polypropylene impact copolymer is not a random copolymer. For example, in some embodiments, the second polypropylene impact copolymer is not a propylene copolymer with random ethylene distribution. In some embodiments, the second polypropylene impact copolymer is a di-block copolymer, a tri-block copolymer, or a multi-block copolymer having more than three blocks. In some embodiments, the second polypropylene impact copolymer comprises, in addition to the isotactic polypropylene units, olefin units. In some embodiments, the olefin units comprise or is selected from the group consisting of ethylene, 1-butene, 2-butene, isobutylene, 1-pentene, 2-pentene, 2-methyl-1-butene, 3-methyl-1-butene, 2-methyl-2-butene, 1-hexene, 2-hexene, 3-hexene, methylpentene, dimethylbutane, or any combination thereof. In some embodiments, the second polypropylene impact copolymer comprises polypropylene and ethylene. In some embodiments, the second polypropylene impact copolymer is not, or is different from, the second non-styrenic polypropylene polymer. In some embodiments, the second polypropylene impact copolymer is not, or is different from, the second olefin block copolymer.

In some embodiments, the core layer comprises 10% to 99% by weight of the second polypropylene impact copolymer based on the total weight of the core layer. In some embodiments, the core layer comprises 10% to 95% by weight of the second polypropylene impact copolymer based on the total weight of the core layer. In some embodiments, the core layer comprises 10% to 90% by weight of the second polypropylene impact copolymer based on the total weight of the core layer. In some embodiments, the core layer comprises 10% to 85% by weight of the second polypropylene impact copolymer based on the total weight of the core layer. In some embodiments, the core layer comprises 10% to 80% by weight of the second polypropylene impact copolymer based on the total weight of the core layer. In some embodiments, the core layer comprises 10% to 75% by weight of the second polypropylene impact copolymer based on the total weight of the core layer. In some embodiments, the core layer comprises 10% to 70% by weight of the second polypropylene impact copolymer based on the total weight of the core layer. In some embodiments, the core layer comprises 10% to 65% by weight of the second polypropylene impact copolymer based on the total weight of the core layer. In some embodiments, the core layer comprises 10% to 60% by weight of the second polypropylene impact copolymer based on the total weight of the core layer. In some embodiments, the core layer comprises 10% to 55% by weight of the second polypropylene impact copolymer based on the total weight of the core layer. In some embodiments, the core layer comprises 10% to 50% by weight of the second polypropylene impact copolymer based on the total weight of the core layer. In some embodiments, the core layer comprises 10% to 45% by weight of the second polypropylene impact copolymer based on the total weight of the core layer. In some embodiments, the core layer comprises 10% to 40% by weight of the second polypropylene impact copolymer based on the total weight of the core layer. In some embodiments, the core layer comprises 10% to 35% by weight of the second polypropylene impact copolymer based on the total weight of the core layer. In some embodiments, the core layer comprises 10% to 30% by weight of the second polypropylene impact copolymer based on the total weight of the core layer. In some embodiments, the core layer comprises 10% to 25% by weight of the second polypropylene impact copolymer based on the total weight of the core layer. In some embodiments, the core layer comprises 10% to 20% by weight of the second polypropylene impact copolymer based on the total weight of the core layer.

In some embodiments, the core layer comprises 15% to 90% by weight of the second polypropylene impact copolymer based on the total weight of the core layer. In some embodiments, the core layer comprises 20% to 90% by weight of the second polypropylene impact copolymer based on the total weight of the core layer. In some embodiments, the core layer comprises 25% to 90% by weight of the second polypropylene impact copolymer based on the total weight of the core layer. In some embodiments, the core layer comprises 30% to 90% by weight of the second polypropylene impact copolymer based on the total weight of the core layer. In some embodiments, the core layer comprises 35% to 90% by weight of the second polypropylene impact copolymer based on the total weight of the core layer. In some embodiments, the core layer comprises 40% to 90% by weight of the second polypropylene impact copolymer based on the total weight of the core layer. In some embodiments, the core layer comprises 45% to 90% by weight of the second polypropylene impact copolymer based on the total weight of the core layer. In some embodiments, the core layer comprises 50% to 90% by weight of the second polypropylene impact copolymer based on the total weight of the core layer. In some embodiments, the core layer comprises 55% to 90% by weight of the second polypropylene impact copolymer based on the total weight of the core layer. In some embodiments, the core layer comprises 60% to 90% by weight of the second polypropylene impact copolymer based on the total weight of the core layer. In some embodiments, the core layer comprises 65% to 90% by weight of the second polypropylene impact copolymer based on the total weight of the core layer. In some embodiments, the core layer comprises 70% to 90% by weight of the second polypropylene impact copolymer based on the total weight of the core layer. In some embodiments, the core layer comprises 75% to 90% by weight of the second polypropylene impact copolymer based on the total weight of the core layer. In some embodiments, the core layer comprises 80% to 90% by weight of the second polypropylene impact copolymer based on the total weight of the core layer. In some embodiments, the core layer comprises 90% to 90% by weight of the second polypropylene impact copolymer based on the total weight of the core layer.

In some embodiments, the core layer comprises 20% to 70% by weight of the second polypropylene impact copolymer based on the total weight of the core layer. In some embodiments, the core layer comprises 20% to 60% by weight of the second polypropylene impact copolymer based on the total weight of the core layer. In some embodiments, the core layer comprises 20% to 55% by weight of the second polypropylene impact copolymer based on the total weight of the core layer. In some embodiments, the core layer comprises 20% to 50% by weight of the second polypropylene impact copolymer based on the total weight of the core layer. In some embodiments, the core layer comprises 20% to 45% by weight of the second polypropylene impact copolymer based on the total weight of the core layer. In some embodiments, the core layer comprises 20% to 40% by weight of the second polypropylene impact copolymer based on the total weight of the core layer. In some embodiments, the core layer comprises 20% to 35% by weight of the second polypropylene impact copolymer based on the total weight of the core layer. In some embodiments, the core layer comprises 30% to 70% by weight of the second polypropylene impact copolymer based on the total weight of the core layer. In some embodiments, the core layer comprises 30% to 60% by weight of the second polypropylene impact copolymer based on the total weight of the core layer. In some embodiments, the core layer comprises 30% to 55% by weight of the second polypropylene impact copolymer based on the total weight of the core layer. In some embodiments, the core layer comprises 40% to 70% by weight of the second polypropylene impact copolymer based on the total weight of the core layer. In some embodiments, the core layer comprises 40% to 65% by weight of the second polypropylene impact copolymer based on the total weight of the core layer. In some embodiments, the core layer comprises 40% to 60% by weight of the second polypropylene impact copolymer based on the total weight of the core layer. In some embodiments, the core layer comprises 40% to 55% by weight of the second polypropylene impact copolymer.

In some embodiments, the core layer comprises an olefin block copolymer. In some embodiments, the core layer comprises a second olefin block copolymer.

In some embodiments, the second olefin block copolymer comprises or is selected from the group consisting of at least one of straight-chain olefins, branched-chain olefins, cycloolefins, polyolefins, or any combination thereof. In some embodiments, the second olefin block copolymer comprises or is selected from the group consisting of ethylene, propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicosene, 1-docosene, 1-tetracosene, 1-hexacosene, 1-octacosene, 1-triacontene, cyclopentene, cycloheptene, norbornene, 5-methyl-2-norbornene, tetracyclododecene, 2-methyl-1,4,5,8-dimethano-1,2,3,4,4a,5,8,8a-octahydronaphthalene, butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1, 6-octadiene, 4-ethylidene-8-methyl-1,7-nonadiene, 5,9-dimethyl-1,4,8-decatriene; 3-phenylpropene, 4-phenylpropene, 1,2-difluoroethylene, tetrafluoroethylene, 3,3,3-trifluoro-1-propene, or any combination thereof.

In some embodiments, the second olefin block copolymer comprises or is selected from the group consisting of at least one of ethylene-1-octene copolymer, propylene-ethylene copolymer, ethylene-1-butene copolymer, propylene-ethylene-1-butene copolymer, ethylene-1-hexene copolymer, ethylene-1-octene copolymer, ethylene-1-hexene-1-octene copolymer, propylene-ethylene-1-hexene copolymer, propylene-ethylene-1-octene copolymer, ethylene-1-butene-1-octene copolymer, or any combination thereof. In some embodiments, the second olefin block copolymer comprises or is selected from the group consisting of at least one of propylene-ethylene copolymer, ethylene-1-octene copolymer, propylene-ethylene 1-butene copolymer, propylene-ethylene-1-hexene copolymer, propylene-ethylene-1-octene copolymer, ethylene-1-butene-1-octene copolymer, or any combination thereof.

In some embodiments, the core layer comprises 1% to 10% by weight of the second olefin block copolymer based on the total weight of the core layer. In some embodiments, the core layer comprises less than 10% by weight of the second olefin block copolymer based on the total weight of the core layer. In some embodiments, the core layer comprises 1% to 9.8% by weight of the second olefin block copolymer based on the total weight of the core layer. In some embodiments, the core layer comprises 1% to 9.6% by weight of the second olefin block copolymer based on the total weight of the core layer. In some embodiments, the core layer comprises 1% to 9.5% by weight of the second olefin block copolymer based on the total weight of the core layer. In some embodiments, the core layer comprises 1% to 9.4% by weight of the second olefin block copolymer based on the total weight of the core layer. In some embodiments, the core layer comprises 1% to 9.2% by weight of the second olefin block copolymer based on the total weight of the core layer. In some embodiments, the core layer comprises 1% to 9% by weight of the second olefin block copolymer based on the total weight of the core layer. In some embodiments, the core layer comprises 1% to 8% by weight of the second olefin block copolymer based on the total weight of the core layer. In some embodiments, the core layer comprises 1% to 7% by weight of the second olefin block copolymer based on the total weight of the core layer. In some embodiments, the core layer comprises 1% to 6% by weight of the second olefin block copolymer based on the total weight of the core layer. In some embodiments, the core layer comprises 1% to 5% by weight of the second olefin block copolymer based on the total weight of the core layer. In some embodiments, the core layer comprises 1% to 4% by weight of the second olefin block copolymer.

In some embodiments, the core layer comprises 2% to 10% by weight of the second olefin block copolymer based on the total weight of the core layer. In some embodiments, the core layer comprises 3% to 10% by weight of the second olefin block copolymer based on the total weight of the core layer. In some embodiments, the core layer comprises 4% to 10% by weight of the second olefin block copolymer based on the total weight of the core layer. In some embodiments, the core layer comprises 5% to 10% by weight of the second olefin block copolymer based on the total weight of the core layer. In some embodiments, the core layer comprises 6% to 10% by weight of the second olefin block copolymer In some embodiments, the core layer comprises 7% to 10% by weight of the second olefin block copolymer based on the total weight of the core layer. In some embodiments, the core layer comprises 1% to 9% by weight of the second olefin block copolymer based on the total weight of the core layer. In some embodiments, the core layer comprises 2% to 9% by weight of the second olefin block copolymer based on the total weight of the core layer. In some embodiments, the core layer comprises 1% to 8% by weight of the second olefin block copolymer based on the total weight of the core layer. In some embodiments, the core layer comprises 2% to 8% by weight of the second olefin block copolymer.

In some embodiments, the core layer comprises a polypropylene elastomer. In some embodiments, the polypropylene elastomer comprises a second polypropylene elastomer.

In some embodiments, the polypropylene elastomer comprises a random polypropylene copolymer comprising polypropylene units with random distribution of olefin units, such as, for example, alpha-olefin units. In some embodiments, the olefin units comprise or are selected from the group consisting of at least one of ethylene, 1-butene, 1-pentene, 1-hexene, 1-octene, 1-decene, 1-dodecene, 1-tetradecene, 1-hexadecene, 1-octadecene, 1-eicosene, 1-docosene, 1-tetracosene, 1-hexacosene, 1-octacosene, 1-triacontene, or any combination thereof.

In some embodiments, the core layer comprises 1% to 10% by weight of the second polypropylene elastomer based on the total weight of the core layer. In some embodiments, the core layer comprises 1% to 9.8% by weight of the second polypropylene elastomer based on the total weight of the core layer. In some embodiments, the core layer comprises 1% to 9.6% by weight of the second polypropylene elastomer based on the total weight of the core layer. In some embodiments, the core layer comprises 1% to 9.5% by weight of the second polypropylene elastomer based on the total weight of the core layer. In some embodiments, the core layer comprises 1% to 9.4% by weight of the second polypropylene elastomer based on the total weight of the core layer. In some embodiments, the core layer comprises 1% to 9.2% by weight of the second polypropylene elastomer based on the total weight of the core layer. In some embodiments, the core layer comprises 1% to 9% by weight of the second polypropylene elastomer based on the total weight of the core layer. In some embodiments, the core layer comprises 1% to 8% by weight of the second polypropylene elastomer based on the total weight of the core layer. In some embodiments, the core layer comprises 1% to 7% by weight of the second polypropylene elastomer based on the total weight of the core layer. In some embodiments, the core layer comprises 1% to 6% by weight of the second polypropylene elastomer based on the total weight of the core layer. In some embodiments, the core layer comprises 1% to 5% by weight of the second polypropylene elastomer based on the total weight of the core layer. In some embodiments, the core layer comprises 1% to 4% by weight of the second polypropylene elastomer.

In some embodiments, the core layer comprises 2% to 10% by weight of the second polypropylene elastomer based on the total weight of the core layer. In some embodiments, the core layer comprises 3% to 10% by weight of the second polypropylene elastomer based on the total weight of the core layer. In some embodiments, the core layer comprises 4% to 10% by weight of the second polypropylene elastomer based on the total weight of the core layer. In some embodiments, the core layer comprises 5% to 10% by weight of the second polypropylene elastomer based on the total weight of the core layer. In some embodiments, the core layer comprises 6% to 10% by weight of the second polypropylene elastomer based on the total weight of the core layer. In some embodiments, the core layer comprises 7% to 10% by weight of the second polypropylene elastomer based on the total weight of the core layer. In some embodiments, the core layer comprises 1% to 9% by weight of the second polypropylene elastomer based on the total weight of the core layer. In some embodiments, the core layer comprises 2% to 9% by weight of the second polypropylene elastomer based on the total weight of the core layer. In some embodiments, the core layer comprises 1% to 8% by weight of the second polypropylene elastomer based on the total weight of the core layer. In some embodiments, the core layer comprises 2% to 8% by weight of the second polypropylene elastomer.

In some embodiments, a weight ratio of the second polypropylene impact copolymer to the second non-styrenic polypropylene polymer is 1:1 to 1:15. In some embodiments, a weight ratio of the second polypropylene impact copolymer to the second non-styrenic polypropylene polymer is 1:1 to 1:14. In some embodiments, a weight ratio of the second polypropylene impact copolymer to the second non-styrenic polypropylene polymer is 1:1 to 1:13. In some embodiments, a weight ratio of the second polypropylene impact copolymer to the second non-styrenic polypropylene polymer is 1:1 to 1:12. In some embodiments, a weight ratio of the second polypropylene impact copolymer to the second non-styrenic polypropylene polymer is 1:1 to 1:11. In some embodiments, a weight ratio of the second polypropylene impact copolymer to the second non-styrenic polypropylene polymer is 1:1 to 1:10. In some embodiments, a weight ratio of the second polypropylene impact copolymer to the second non-styrenic polypropylene polymer is 1:2 to 1:14. In some embodiments, a weight ratio of the second polypropylene impact copolymer to the second non-styrenic polypropylene polymer is 1:2 to 1:13. In some embodiments, a weight ratio of the second polypropylene impact copolymer to the second non-styrenic polypropylene polymer is 1:1 to 1:9. In some embodiments, a weight ratio of the second polypropylene impact copolymer to the second non-styrenic polypropylene polymer is 1:1 to 1:8. In some embodiments, a weight ratio of the second polypropylene impact copolymer to the second non-styrenic polypropylene polymer is 1:1 to 1:7. In some embodiments, a weight ratio of the second polypropylene impact copolymer to the second non-styrenic polypropylene polymer is 1:1 to 1:6. In some embodiments, a weight ratio of the second polypropylene impact copolymer to the second non-styrenic polypropylene polymer is 1:1 to 1:5. In some embodiments, a weight ratio of the second polypropylene impact copolymer to the second non-styrenic polypropylene polymer is 1:1 to 1:4. In some embodiments, a weight ratio of the second polypropylene impact copolymer to the second non-styrenic polypropylene polymer is 1:1 to 1:3. In some embodiments, a weight ratio of the second polypropylene impact copolymer to the second non-styrenic polypropylene polymer is 1:2 to 1:4.

In some embodiments, a weight ratio of the second olefin block copolymer to the second non-styrenic polypropylene polymer is 1:1 to 1:10. In some embodiments, a weight ratio of the second olefin block copolymer to the second non-styrenic polypropylene polymer is 1:2 to 1:10. In some embodiments, a weight ratio of the second olefin block copolymer to the second non-styrenic polypropylene polymer is 1:3 to 1:10. In some embodiments, a weight ratio of the second olefin block copolymer to the second non-styrenic polypropylene polymer is 1:4 to 1:10. In some embodiments, a weight ratio of the second olefin block copolymer to the second non-styrenic polypropylene polymer is 1:5 to 1:10. In some embodiments, a weight ratio of the second olefin block copolymer to the second non-styrenic polypropylene polymer is 1:6 to 1:10. In some embodiments, a weight ratio of the second olefin block copolymer to the second non-styrenic polypropylene polymer is 1:7 to 1:10. In some embodiments, a weight ratio of the second olefin block copolymer to the second non-styrenic polypropylene polymer is 1:8 to 1:10. In some embodiments, a weight ratio of the second olefin block copolymer to the second non-styrenic polypropylene polymer is 1:1 to 1:9. In some embodiments, a weight ratio of the second olefin block copolymer to the second non-styrenic polypropylene polymer is 1:1 to 1:8. In some embodiments, a weight ratio of the second olefin block copolymer to the second non-styrenic polypropylene polymer is 1:1 to 1:7. In some embodiments, a weight ratio of the second olefin block copolymer to the second non-styrenic polypropylene polymer is 1:1 to 1:6. In some embodiments, a weight ratio of the second olefin block copolymer to the second non-styrenic polypropylene polymer is 1:1 to 1:5. In some embodiments, a weight ratio of the second olefin block copolymer to the second non-styrenic polypropylene polymer is 1:1 to 1:4. In some embodiments, a weight ratio of the second olefin block copolymer to the second non-styrenic polypropylene polymer is 1:1 to 1:3. In some embodiments, a weight ratio of the second olefin block copolymer to the second non-styrenic polypropylene polymer is 1:2 to 1:9. In some embodiments, a weight ratio of the second olefin block copolymer to the second non-styrenic polypropylene polymer is 1:3 to 1:8. In some embodiments, a weight ratio of the second olefin block copolymer to the second non-styrenic polypropylene polymer is 1:4 to 1:7. In some embodiments, a weight ratio of the second olefin block copolymer to the second non-styrenic polypropylene polymer is less than 3. In some embodiments, a weight ratio of the second olefin block copolymer to the second non-styrenic polypropylene polymer is from 0.1 to 2. In some embodiments, a weight ratio of the second olefin block copolymer to the second non-styrenic polypropylene polymer is from 0.1 to 1.

In some embodiments, a weight ratio of the second polypropylene impact copolymer to the second olefin block copolymer is 1:100 to 1:2 and/or 2:1 to 100:1. In some embodiments, a weight ratio of the second polypropylene impact copolymer to the second olefin block copolymer is 1:100 to 1:2.1 and/or 2.1:1 to 100:1. In some embodiments, a weight ratio of the second polypropylene impact copolymer to the second olefin block copolymer is 1:100 to 1:2.2 and/or 2.2:1 to 100:1. In some embodiments, a weight ratio of the second polypropylene impact copolymer to the second olefin block copolymer is 1:100 to 1:2.3 and/or 2.3:1 to 100:1. In some embodiments, a weight ratio of the second polypropylene impact copolymer to the second olefin block copolymer is 1:100 to 1:2.4 and/or 2.4:1 to 100:1. In some embodiments, a weight ratio of the second polypropylene impact copolymer to the second olefin block copolymer is 1:100 to 1:2.5 and/or 2.5:1 to 100:1. In some embodiments, a weight ratio of the second polypropylene impact copolymer to the second olefin block copolymer is 1:100 to 1:2.6 and/or 2.6:1 to 100:1. In some embodiments, a weight ratio of the second polypropylene impact copolymer to the second olefin block copolymer is 1:100 to 1:2.7 and/or 2.7:1 to 100:1. In some embodiments, a weight ratio of the second polypropylene impact copolymer to the second olefin block copolymer is 1:100 to 1:2.8 and/or 2.8:1 to 100:1. In some embodiments, a weight ratio of the second polypropylene impact copolymer to the second olefin block copolymer is 1:100 to 1:2.9 and/or 2.9:1 to 100:1. In some embodiments, a weight ratio of the second polypropylene impact copolymer to the second olefin block copolymer is 1:100 to 1:3 and/or 3:1 to 100:1.

In some embodiments, a weight ratio of the second polypropylene impact copolymer to the second polypropylene elastomer is 1:100 to 1:2 and/or 2:1 to 100:1. In some embodiments, a weight ratio of the second polypropylene impact copolymer to the second polypropylene elastomer is 1:100 to 1:2.1 and/or 2.1:1 to 100:1. In some embodiments, a weight ratio of the second polypropylene impact copolymer to the second polypropylene elastomer is 1:100 to 1:2.2 and/or 2.2:1 to 100:1. In some embodiments, a weight ratio of the second polypropylene impact copolymer to the second polypropylene elastomer is 1:100 to 1:2.3 and/or 2.3:1 to 100:1. In some embodiments, a weight ratio of the second polypropylene impact copolymer to the second polypropylene elastomer is 1:100 to 1:2.4 and/or 2.4:1 to 100:1. In some embodiments, a weight ratio of the second polypropylene impact copolymer to the second polypropylene elastomer is 1:100 to 1:2.5 and/or 2.5:1 to 100:1. In some embodiments, a weight ratio of the second polypropylene impact copolymer to the second polypropylene elastomer is 1:100 to 1:2.6 and/or 2.6:1 to 100:1. In some embodiments, a weight ratio of the second polypropylene impact copolymer to the second polypropylene elastomer is 1:100 to 1:2.7 and/or 2.7:1 to 100:1. In some embodiments, a weight ratio of the second polypropylene impact copolymer to the second polypropylene elastomer is 1:100 to 1:2.8 and/or 2.8:1 to 100:1. In some embodiments, a weight ratio of the second polypropylene impact copolymer to the second polypropylene elastomer is 1:100 to 1:2.9 and/or 2.9:1 to 100:1. In some embodiments, a weight ratio of the second polypropylene impact copolymer to the second polypropylene elastomer is 1:100 to 1:3 and/or 3:1 to 100:1.

In some embodiments, the core layer has a thickness of 10 mil to 45 mil. In some embodiments, the core layer has a thickness of 10 mil to 44 mil. In some embodiments, the core layer has a thickness of 10 mil to 42 mil. In some embodiments, the core layer has a thickness of 10 mil to 40 mil. In some embodiments, the core layer has a thickness of 10 mil to 38 mil. In some embodiments, the core layer has a thickness of 10 mil to 36 mil. In some embodiments, the core layer has a thickness of 10 mil to 35 mil. In some embodiments, the core layer has a thickness of 10 mil to 34 mil. In some embodiments, the core layer has a thickness of 10 mil to 32 mil. In some embodiments, the core layer has a thickness of 10 mil to 30 mil. In some embodiments, the core layer has a thickness of 10 mil to 28 mil. In some embodiments, the core layer has a thickness of 10 mil to 26 mil. In some embodiments, the core layer has a thickness of 10 mil to 25 mil. In some embodiments, the core layer has a thickness of 10 mil to 24 mil. In some embodiments, the core layer has a thickness of 10 mil to 22 mil. In some embodiments, the core layer has a thickness of 10 mil to 20 mil. In some embodiments, the core layer has a thickness of 10 mil to 18 mil. In some embodiments, the core layer has a thickness of 10 mil to 16 mil. In some embodiments, the core layer has a thickness of 10 mil to 15 mil.

In some embodiments, the core layer has a thickness of 12 mil to 45 mil. In some embodiments, the core layer has a thickness of 14 mil to 45 mil. In some embodiments, the core layer has a thickness of 15 mil to 45 mil. In some embodiments, the core layer has a thickness of 16 mil to 45 mil. In some embodiments, the core layer has a thickness of 18 mil to 45 mil. In some embodiments, the core layer has a thickness of 20 mil to 45 mil. In some embodiments, the core layer has a thickness of 22 mil to 45 mil. In some embodiments, the core layer has a thickness of 24 mil to 45 mil. In some embodiments, the core layer has a thickness of 25 mil to 45 mil. In some embodiments, the core layer has a thickness of 26 mil to 45 mil. In some embodiments, the core layer has a thickness of 28 mil to 45 mil. In some embodiments, the core layer has a thickness of 30 mil to 45 mil. In some embodiments, the core layer has a thickness of 32 mil to 45 mil. In some embodiments, the core layer has a thickness of 34 mil to 45 mil. In some embodiments, the core layer has a thickness of 35 mil to 45 mil. In some embodiments, the core layer has a thickness of 36 mil to 45 mil. In some embodiments, the core layer has a thickness of 38 mil to 45 mil. In some embodiments, the core layer has a thickness of 40 mil to 45 mil. In some embodiments, the core layer has a thickness of 10 mil to 30 mil. In some embodiments, the core layer has a thickness of 20 mil to 30 mil.

In some embodiments, the core layer comprises at least one filler. In some embodiments, the at least one filler may comprise, consist of, or consist essentially of at least one of limestone, glass, calcium carbonate, barium sulfate, calcium sulfate, talc, perlite, silica, fumed silica, precipitated silica, quartz, aluminum trihydrate, magnesium hydroxide, ammonium polyphosphate, colemanite, titanium dioxide, calcium sulfate, fly ash, graphene nanoparticles, carbon black, recycled materials (e.g., such as one or more of recycled rubber tires, recycled shingles, recycled thermoplastic resins), basalt, roofing granules, graphite, clay, or any combination thereof. In some embodiments, the at least one filler comprises at least one additive. In some embodiments, the at least one additive comprises or is selected from the group stabilizers, antioxidants, colorants, nucleating agents, mold release agents, dispersing agents, UV light absorbers, flame retardants, coloring agents, mold release agents, anti-static agents, pigments, or any combination thereof.

In some embodiments, the core layer comprises 1% to 60% by weight of the at least one filler based on the total weight of the core layer. In some embodiments, the core layer comprises 1% to 55% by weight of the at least one filler based on the total weight of the core layer. In some embodiments, the core layer comprises 1% to 50% by weight of the at least one filler based on the total weight of the core layer based on the total weight of the core layer. In some embodiments, the core layer comprises 1% to 45% by weight of the at least one filler based on the total weight of the core layer. In some embodiments, the core layer comprises 1% to 40% by weight of the at least one filler based on the total weight of the core layer. In some embodiments, the core layer comprises 1% to 35% by weight of the at least one filler based on the total weight of the core layer. In some embodiments, the core layer comprises 1% to 30% by weight of the at least one filler based on the total weight of the core layer. In some embodiments, the core layer comprises 1% to 25% by weight of the at least one filler based on the total weight of the core layer. In some embodiments, the core layer comprises 1% to 20% by weight of the at least one filler based on the total weight of the core layer. In some embodiments, the core layer comprises 1% to 15% by weight of the at least one filler based on the total weight of the core layer. In some embodiments, the core layer comprises 1% to 10% by weight of the at least one filler based on the total weight of the core layer. In some embodiments, the core layer comprises 1% to 5% by weight of the at least one filler.

In some embodiments, the core layer comprises 5% to 60% by weight of the at least one filler based on the total weight of the core layer. In some embodiments, the core layer comprises 10% to 60% by weight of the at least one filler based on the total weight of the core layer. In some embodiments, the core layer comprises 15% to 60% by weight of the at least one filler based on the total weight of the core layer. In some embodiments, the core layer comprises 20% to 60% by weight of the at least one filler based on the total weight of the core layer. In some embodiments, the core layer comprises 25% to 60% by weight of the at least one filler based on the total weight of the core layer. In some embodiments, the core layer comprises 30% to 60% by weight of the at least one filler based on the total weight of the core layer. In some embodiments, the core layer comprises 35% to 60% by weight of the at least one filler based on the total weight of the core layer. In some embodiments, the core layer comprises 40% to 60% by weight of the at least one filler based on the total weight of the core layer. In some embodiments, the core layer comprises 45% to 60% by weight of the at least one filler based on the total weight of the core layer. In some embodiments, the core layer comprises 10% to 40% by weight of the at least one filler based on the total weight of the core layer. In some embodiments, the core layer comprises 10% to 30% by weight of the at least one filler based on the total weight of the core layer. In some embodiments, the core layer comprises 2% to 10% by weight of the at least one filler based on the total weight of the core layer. In some embodiments, the core layer comprises 2% to 8% by weight of the at least one filler.

In some embodiments, the second non-styrenic polypropylene copolymer is the same as the second non-styrenic polypropylene copolymer. In some embodiments, the second non-styrenic polypropylene copolymer is different from the second non-styrenic polypropylene copolymer. In some embodiments, the second polypropylene impact copolymer is the same as the first polypropylene impact copolymer. In some embodiments, the second polypropylene impact copolymer is different from the first polypropylene impact copolymer. In some embodiments, the second olefin block copolymer is the same as the first olefin block copolymer. In some embodiments, the second olefin block copolymer is different from the first olefin block copolymer.

In some embodiments, the roofing membrane further comprises an adhesive layer on a bottom surface of the core layer. In some embodiments, the adhesive layer adheres the roofing membrane to a roofing substrate. In some embodiments, the adhesive layer adheres a removable liner to the roofing membrane.

In some embodiments, the adhesive layer comprises, consists of, or consists essentially of at least one of an epoxy adhesive, a polyurethane adhesive, an acrylic adhesive, an ultraviolet radiation cured adhesive, a silicone-containing adhesive, a silyl modified polymer, a silane terminated polymer, natural rubber, a polyolefin polymer, a poly-alpha-olefin (APAO/APO) polymer, a polyamide polyvinyl acetate, a poly vinyl acetate, a polyvinyl alcohol, an ethylene vinyl acetate, a polyamide, a polyester, a polyester amide, an ethylene acrylic, a butyl rubber, or any combination thereof.

In some embodiments, the adhesive layer having a thickness of 4 mil to 15 mil. In some embodiments, the adhesive layer has a thickness of 5 mil to 15 mil. In some embodiments, the adhesive layer has a thickness of 6 mil to 15 mil. In some embodiments, the adhesive layer has a thickness of 7 mil to 15 mil. In some embodiments, the adhesive layer has a thickness of 8 mil to 15 mil. In some embodiments, the adhesive layer has a thickness of 9 mil to 15 mil. In some embodiments, the adhesive layer has a thickness of 10 mil to 15 mil. In some embodiments, the adhesive layer has a thickness of 11 mil to 15 mil. In some embodiments, the adhesive layer has a thickness of 12 mil to 15 mil. In some embodiments, the adhesive layer has a thickness of 13 mil to 15 mil. In some embodiments, the adhesive layer has a thickness of 4 mil to 14 mil. In some embodiments, the adhesive layer has a thickness of 4 mil to 13 mil. In some embodiments, the adhesive layer has a thickness of 4 mil to 12 mil. In some embodiments, the adhesive layer has a thickness of 4 mil to 11 mil. In some embodiments, the adhesive layer has a thickness of 4 mil to 10 mil. In some embodiments, the adhesive layer has a thickness of 4 mil to 9 mil. In some embodiments, the adhesive layer has a thickness of 4 mil to 8 mil. In some embodiments, the adhesive layer has a thickness of 4 mil to 7 mil. In some embodiments, the adhesive layer has a thickness of 4 mil to 6 mil.

In some embodiments, the roofing membrane has a thickness of 40 mil to 100 mil. In some embodiments, the roofing membrane has a thickness of 45 mil to 100 mil. In some embodiments, the roofing membrane has a thickness of 50 mil to 100 mil. In some embodiments, the roofing membrane has a thickness of 55 mil to 100 mil. In some embodiments, the roofing membrane has a thickness of 60 mil to 100 mil. In some embodiments, the roofing membrane has a thickness of 65 mil to 100 mil. In some embodiments, the roofing membrane has a thickness of 70 mil to 100 mil. In some embodiments, the roofing membrane has a thickness of 75 mil to 100 mil. In some embodiments, the roofing membrane has a thickness of 80 mil to 100 mil. In some embodiments, the roofing membrane has a thickness of 85 mil to 100 mil. In some embodiments, the roofing membrane has a thickness of 90 mil to 100 mil. In some embodiments, the roofing membrane has a thickness of 40 mil to 90 mil. In some embodiments, the roofing membrane has a thickness of 40 mil to 85 mil. In some embodiments, the roofing membrane has a thickness of 40 mil to 80 mil. In some embodiments, the roofing membrane has a thickness of 40 mil to 75 mil. In some embodiments, the roofing membrane has a thickness of 40 mil to 70 mil. In some embodiments, the roofing membrane has a thickness of 40 mil to 65 mil. In some embodiments, the roofing membrane has a thickness of 40 mil to 60 mil. In some embodiments, the roofing membrane has a thickness of 40 mil to 55 mil. In some embodiments, the roofing membrane has a thickness of 40 mil to 50 mil.

As used herein, the term "curling" refers to a measurable detachment of the roofing membrane from a substrate, such as, for example and without limitation, the polyisocyanate board. In some embodiments, the degree of curling is quantified by measuring a height of the upper most portion of the curled portion of the roofing membrane relative to a top surface of the substrate. In some embodiments, a roofing membrane exhibits slight curling when the degree of curling is less than 0.5 inches. In some embodiments, a roofing membrane exhibits no curling when the degree of curling is less than 0.1 inches.

In some embodiments, the roofing membrane, when applied to a polyisocyanate board with a paper facer, does not exhibit curling after seven days. In some embodiments, the roofing membrane, when applied to a polyisocyanate board with a paper facer, exhibits a degree of curling of less than 0.1 inches. In some embodiments, the roofing membrane, when applied to a polyisocyanate board with a paper facer, exhibits slight curling after seven days. In some embodiments, the roofing membrane, when applied to a polyisocyanate board with a paper facer, exhibits a degree of curling of 0.1 inches to 0.5 inches. In some embodiments, the roofing membrane, when applied to a polyisocyanate board with a paper facer, exhibits a degree of curling of 0.1 inches to 0.4 inches. In some embodiments, the roofing membrane, when applied to a polyisocyanate board with a paper facer, exhibits a degree of curling of 0.1 inches to 0.3 inches. In some embodiments, the roofing membrane, when applied to a polyisocyanate board with a paper facer, exhibits a degree of curling of 0.1 inches to 0.2 inches. In some embodiments, the roofing membrane, when applied to a polyisocyanate board with a paper facer, exhibits a degree of curling of 0.2 inches to 0.5 inches. In some embodiments, the roofing membrane, when applied to a polyisocyanate board with a paper facer, exhibits a degree of curling of 0.3 inches to 0.5 inches. In some embodiments, the roofing membrane, when applied to a polyisocyanate board with a paper facer, exhibits a degree of curling of 0.4 inches to 0.5 inches.

A non-limiting example of a roofing membrane is shown in FIG. 1 according to some embodiments. As shown in FIG. 1, in some embodiments, the roofing membrane 100 comprises a scrim 102. In some embodiments, the scrim 102 has a top surface and a bottom surface. In some embodiments, the roofing membrane 100 comprises a cap layer 104 on the top surface of the scrim 102. In some embodiments, the roofing membrane 100 comprises a core layer 106 on the bottom surface of the scrim 102. In some embodiments, the roofing membrane 100 comprises an adhesive layer 108 on a bottom surface of the core layer 106. In some embodiments, the roofing membrane 100 is configured to be adhered to a roofing substrate by the adhesive layer 108. In some embodiments, the roofing membrane 100 is configured to provide a waterproof covering over a roofing substrate.

Figure 2:
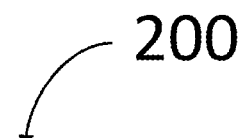
FIG. 2 is a schematic diagram of a roofing structure, according to some embodiments.
Figure 2:
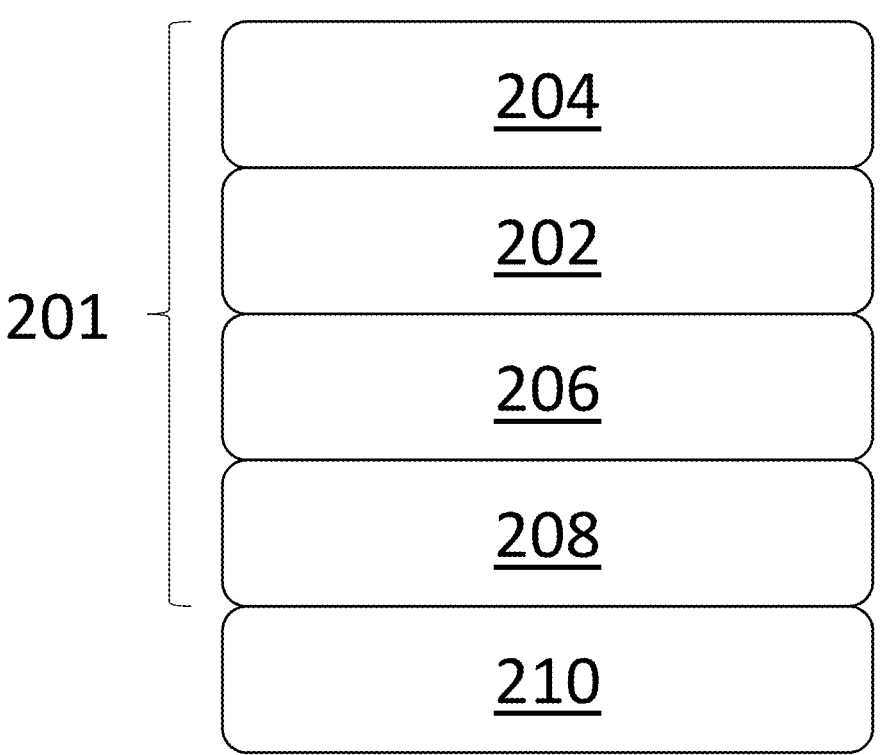

A non-limiting example of a roofing structure is shown in FIG. 2 according to some embodiments. As shown in FIG. 2, in some embodiments, the roofing structure 200 comprises roofing membrane 201. In some embodiments, the roofing membrane 201 comprises a scrim 202. In some embodiments, the scrim 202 has a top surface and a bottom surface. In some embodiments, the roofing membrane 201 comprises a cap layer 204 on the top surface of the scrim 202. In some embodiments, the roofing membrane 201 comprises a core layer 206 on the bottom surface of the scrim 202. In some embodiments, the roofing membrane 201 comprises an adhesive layer 208 on a bottom surface of the core layer 206. In some embodiments, the roofing structure 200 comprises a roofing substrate 210. In some embodiments, the adhesive layer 208 of the roofing membrane 201 contacts the roofing substrate 210. In some embodiments, the adhesive layer 208 is absent. For example, in some embodiments, the core layer 206 of the roofing membrane 201 contacts the roofing substrate 210.

Figure 3:
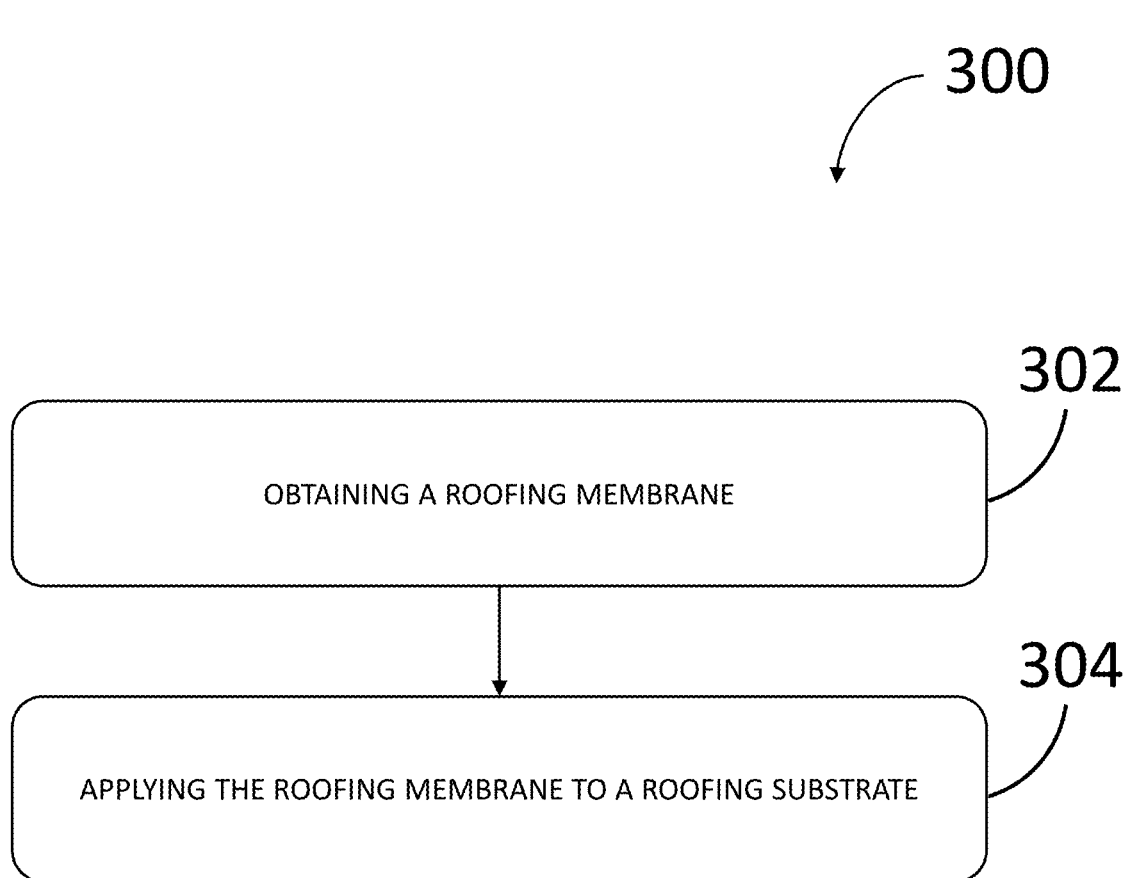
FIG. 3 is a flowchart of a method for installing a roofing membrane, according to some embodiments.

A non-limiting example of a system and method for installing a roofing membrane is shown in FIG. 3 according to some embodiments. As shown in FIG. 3, in some embodiments, the method 300 for installing the roofing membrane comprises a step 302 of obtaining a roofing membrane. In some embodiments, the roofing membrane comprises, consists of, or consists essentially of any one or more of the roofing membranes disclosed herein. In some embodiments, the method 300 for installing the roofing membrane comprises a step 302 of applying the roofing membrane to a roofing substrate. In some embodiments, the applying comprises at least one of adhering, contacting, welding, fastening, attaching, heating, securing, or any combination thereof.

In some embodiments, the roofing substrate comprises, consists of, or consists essentially of at least one of a plywood substrate, a glass substrate, a cellulosic substrate, a polymeric substrate, a shingle, a scrim, a fabric, a glass mat, a fiberglass mat, an asphalt-coated fiberglass mat, a fabric, an underlayment, a roof deck, a photovoltaic (PV) panel, a modified bitumen (MODBIT) substrate, a roll good, a board (such as but not limited to at least one of a foam board (e.g., a polyisocyanurate (ISO) foam board), a cover board, a gypsum board, or any combination thereof), a pipe, a base sheet, a chimney, a wax paper, or any combination thereof. In some embodiments, the substrate comprises asphalt. In some embodiments, the substrate does not comprise asphalt (e.g., 0% by weight of asphalt based on a total weight of the substrate). In some embodiments, the roofing substrate comprises, consists of, or consists essentially of at least one of plywood, cement, concrete, asphaltic shingles, compressed fiberboard, gypsum, oriented strand board, concrete masonry units, masonry blocks, bricks, polyiso foam, polyisocyanurate, steel, aluminum, copper, minerals, limestone, thermoplastic polyolefin, polyvinyl chloride, silicone, polyvinylidene fluoride, polymethyl methacrylate, acrylic or combinations thereof.

Example 1

Roofing Membrane Sample A

A Roofing Membrane Sample A having the formulation layers presented in Table 1 below was prepared. The weight ratio was calculated as a weight ratio of each respective component to the total weight of the olefin block copolymer. In addition, the weight ratios were calculated separately for each of the core layer and the cap layer.

TABLE 1

| Formulation Layers for Roofing Membrane Sample A | | |
|---|---|---|
| Components | Core Layer (Weight Ratio) | Cap Layer (Weight Ratio) |
| Non-Styrenic Polypropylene Copolymer | 6:1 | 5.5:1 |
| Polypropylene Impact Copolymer | 0.5:1 | 2:1 |
| Olefin Block Copolymer | 1:1 | 1:1 |
| Additives | 5:1 | 4:1 |

The Roofing Membrane Sample A had a polyester scrim between the core layer and the cap layer.

Example 2

Roofing Membrane Sample B

A Roofing Membrane Sample B having the formulation layers presented in Table 2 below was prepared. The weight ratio was calculated as a weight ratio of each respective component to the total weight of the polypropylene elastomer. In addition, the weight ratios were calculated separately for each of the core layer and the cap layer.

TABLE 2

| Formulation Layers for Roofing Membrane B | | |
|---|---|---|
| Components | Core Layer (Weight Ratio) | Cap Layer (Weight Ratio) |
| Non-Styrenic Polypropylene Copolymer | 6:1 | 5.5:1 |
| Polypropylene Impact Copolymer | 2:1 | 2:1 |
| Polypropylene Elastomer | 1:1 | 1:1 |
| Additives | 3.5:1 | 4:1 |

The Roofing Membrane Sample B had a polyester scrim between the core layer and the cap layer.

Example 3

Control Roofing Membrane

A Control Roofing Membrane having the formulation layers presented in Table 3 below was prepared. The Control Roofing Membrane did not comprise an olefin block copolymer, nor a polypropylene elastomer.

TABLE 3

| Formulation Layers for Control Roofing Membrane | | |
|---|---|---|
| Components | Core Layer (wt. %) | Cap Layer (wt. %) |
| Non-Styrenic Polypropylene Copolymer | 80% | 44% |
| Polypropylene Impact Copolymer | 12% | 10% |
| Additives | 8% | 46% |

The Control Roofing Membrane had a polyester scrim between the core layer and the cap layer.

Example 4

Curling/No Curling

Roofing Membrane Samples A and B were prepared and compared to the Control Roofing Membrane. An adhesive was applied to a bottom surface of the core layer for each of the Roofing Membrane Samples A and B and for the Control Roofing Membrane. The Roofing Membrane Samples A and B and the Control Roofing Membrane were subsequently applied to a 2'×2' ISO board with a paper facer. After seven days, the Roofing Membrane Samples A and B and the Control Roofing Membrane were observed for curling or no curling. The results are summarized in Table 4 below.

TABLE 4

| Comparison of Sample Roofing Membranes to Control Roofing Membrane | |
|---|---|
| | Curling/No Curling |
| Control Roofing Membrane | Curling |
| Sample Roofing Membrane A | No Curling |
| Sample Roofing Membrane B | Slight Curling (less than Control) |

The Sample Roofing Membrane A and the Sample Roofing Membrane B unexpectedly exhibited no curling to slight curling after seven days the olefin block copolymer was included in each of the core layer and the cap layer. In contrast, the Control Roofing Membrane exhibited curling after seven days.

Example 5

Tack and Adhesion

The Roofing Membrane Sample A, the Roofing Membrane Sample B, and the Control Roofing Membrane were further tested for tack and adhesion. Tack and adhesion testing was conducted by applying a 2" wide strip of each of roofing membrane to an ISO board. After being applied, the Roofing Membrane Sample A, the Roofing Membrane Sample B, and the Control Roofing Membrane were observed for (a) tack and designated as having no tack, low tack, medium tack, or high tack, and (b) adhesion and designated as having no adhesion, low adhesion, medium adhesion, or high adhesion. The results are summarized in Table 5 below.

TABLE 5

| Tack and Adhesion Testing | | |
|---|---|---|
| | Tack | Adhesion |
| Control Roofing Membrane | No tack | No adhesion |
| Sample Roofing Membrane A | High tack | High adhesion |
| Sample Roofing Membrane B | High tack | High adhesion |

Example 6

Roofing Membrane Sample C

Additional roofing membrane samples were prepared. In particular, a Roofing Membrane Sample C having the formulation layers presented in Table 6 below was prepared. The weight ratio was calculated as a weight ratio of each respective component to the total weight of the olefin block copolymer. In addition, the weight ratios were calculated separately for each of the core layer and the cap layer.

TABLE 6

| Formulation Layers for Roofing Membrane Formulation Sample C | | |
|---|---|---|
| Components | Core Layer (Weight Ratio) | Cap Layer (Weight Ratio) |
| Non-Styrenic Polypropylene Copolymer | 5:1 | 4.5:1 |
| Polypropylene Impact Copolymer | 0.5:1 | 1.5:1 |
| Olefin Block Copolymer | 1:1 | 1:1 |
| Additives | 4:1 | 3.5:1 |

The Roofing Membrane Sample C had a polyester scrim between the core layer and the cap layer.

Example 7

Roofing Membrane Sample D

A Roofing Membrane Sample D having the formulation layers presented in Table 7 below was prepared. The weight ratio was calculated as a weight ratio of each respective component to the total weight of the olefin block copolymer. In addition, the weight ratios were calculated separately for each of the core layer and the cap layer.

TABLE 7

| Formulation Layers for Roofing Membrane Formulation Sample D | | |
|---|---|---|
| Components | Core Layer (Weight Ratio) | Cap Layer (Weight Ratio) |
| Non-Styrenic Polypropylene Copolymer | 6:1 | 5.5:1 |
| Polypropylene Impact Copolymer | 2:1 | 2:1 |
| Olefin Block Copolymer | 1:1 | 1:1 |
| Additives | 3.5:1 | 4:1 |

The Roofing Membrane Sample D had a polyester scrim between the core layer and the cap layer.

Example 8

Roofing Membrane Sample E

Roofing Membrane E is prepared to comprise 1% by weight of an olefin block copolymer based on a total weight of the cap layer and 1% by weight of the olefin block copolymer based on the total weight of the core layer. Roofing Membrane F is prepared to comprise 9% by weight of the olefin block copolymer based on a total weight of the cap layer and 9% by weight of the olefin block copolymer based on the total weight of the core layer. Roofing Membrane G is prepared to comprise 10% by weight of the olefin block copolymer based on a total weight of the cap layer and 10% by weight of the olefin block copolymer based on the total weight of the core layer. Sample Roofing Membrane H was prepared with greater than 10% by weight of the olefin block copolymer based on a total weight of the cap layer and greater than 10% by weight of the olefin block copolymer based on the total weight of the core layer. A Control Roofing Membrane 2 was prepared without an olefin block copolymer and without a polypropylene elastomer. The Roofing Membrane Samples E-H and the Control Roofing Membrane 2 are applied to a 2'×2' ISO board with a paper facer. After seven days, the Roofing Membrane Samples E-H and the Control Roofing Membrane 2 are observed for curling or no curling. The results are summarized in Table 8 below.

TABLE 8

| Comparison of Sample Roofing Membranes to Control Roofing Membrane | |
|---|---|
| | Curling/No Curling |
| Control Roofing Membrane 2 | Curling |
| Sample Roofing Membrane E | No Curling |
| Sample Roofing Membrane F | No Curling |
| Sample Roofing Membrane G | No Curling |
| Sample Roofing Membrane H | Curling |

The Sample Roofing Membranes E, F, and G unexpectedly exhibits no curling after seven days when the olefin block copolymer is included in each of the core layer and the cap layer in a range of 1% to 10% by weight based on a total weight of each of the core layer and cap layer. In contrast, Sample Roofing Membrane H exhibited curling after seven days, with a 0.5 inch curl. In addition, the Control Roofing Membrane 2 also exhibited curling after seven days with a 1.75 inch curl.

What is claimed is:

1. A roofing membrane comprising:
   a cap layer,
      wherein the cap layer comprises:
         a polypropylene copolymer;
         an olefin block copolymer; and
         a flame retardant,
            wherein the cap layer comprises no greater than 25% by weight of the flame retardant based on a total weight of the cap layer;
   a core polymer layer; and
   a scrim between the cap layer and the core polymer layer.

2. The roofing membrane of claim 1, wherein the cap layer comprises a plurality of sublayers.

3. The roofing membrane of claim 1, wherein the polypropylene copolymer comprises at least one of a first non-styrene polypropylene copolymer, a first polypropylene impact copolymer, or any combination thereof.

4. The roofing membrane of claim 1, wherein the polypropylene copolymer comprises polymer units derived from at least one of $C_2$ alpha-olefins, $C_4$-$C_{20}$ alpha-olefins, $C_4$-$C_{18}$ alpha-olefins, $C_4$-$C_{20}$ alpha-olefins, $C_4$-$C_{16}$ alpha-olefins, $C_4$-$C_{14}$ alpha-olefins, $C_4$-$C_{12}$ alpha-olefins, $C_4$-$C_{10}$ alpha-olefins, $C_4$-$C_8$ alpha-olefins, $C_4$-$C_6$ alpha-olefins, $C_6$-$C_{20}$ alpha-olefins, $C_6$-$C_{18}$ alpha-olefins, $C_6$-$C_{16}$ alpha-olefins, $C_6$-$C_{14}$ alpha-olefins, $C_6$-$C_{12}$ alpha-olefins, $C_6$-$C_{10}$ alpha-olefins, $C_6$-$C_8$ alpha-olefins, $C_8$-$C_{20}$ alpha-olefins, $C_{10}$-$C_{20}$ alpha-olefins, $C_{10}$-$C_{12}$ alpha-olefins, $C_{10}$-$C_{16}$ alpha-olefins, $C_{10}$-$C_{18}$ alpha-olefins, $C_{20}$-$C_{30+}$ alpha-olefins, or any combination thereof.

5. The roofing membrane of claim 1, wherein the cap layer comprises:

10% to 80% by weight of a first non-styrenic polypropylene copolymer based on the total weight of the cap layer;

10% to 50% by weight of a first polypropylene impact copolymer based on the total weight of the cap layer; and 1% to 10% by weight of a first olefin block copolymer based on the total weight of the cap layer.

6. The roofing membrane of claim 5, wherein the cap layer comprises 1% to 25% by weight of the flame retardant based on the total weight of the cap layer.

7. The roofing membrane of claim 1, wherein the core polymer layer comprises a plurality of sublayers.

8. The roofing membrane of claim 1, wherein the core polymer layer comprises at least one of a second non-styrenic polypropylene copolymer, a second polypropylene impact copolymer, a second olefin block copolymer, or any combination thereof.

9. The roofing membrane of claim 1, wherein the core polymer layer comprises:

a second polypropylene impact copolymer;

10% to 80% by weight of a second non-styrenic polypropylene copolymer based on a total weight of the core polymer layer; and 1% to 10% by weight of a second olefin block copolymer based on the total weight of the core polymer layer.

10. The roofing membrane of claim 8, wherein the core polymer layer further comprises 1% to 60% by weight of a filler based on the total weight of the core polymer layer.

11. A roofing membrane comprising:

a cap layer, wherein the cap layer comprises:

a polypropylene copolymer;

a polypropylene elastomer; and a flame retardant, wherein the cap layer comprises no greater than 25% by weight of the flame retardant based on a total weight of the cap layer;

a core polymer layer; and a scrim between the cap layer and the core polymer layer.

12. The roofing membrane of claim 11, wherein the cap layer comprises a plurality of sublayers.

13. The roofing membrane of claim 11, wherein the polypropylene copolymer comprises polymer units derived from at least one of $C_2$ alpha-olefins, $C_4$-$C_{20}$ alpha-olefins, $C_4$-$C_{18}$ alpha-olefins, $C_4$-$C_{20}$ alpha-olefins, $C_4$-$C_{16}$ alpha-olefins, $C_4$-$C_{14}$ alpha-olefins, $C_4$-$C_{12}$ alpha-olefins, $C_4$-$C_{10}$ alpha-olefins, $C_4$-$C_8$ alpha-olefins, $C_4$-$C_6$ alpha-olefins, $C_6$-$C_{20}$ alpha-olefins, $C_6$-$C_{18}$ alpha-olefins, $C_6$-$C_{16}$ alpha-olefins, $C_6$-$C_{14}$ alpha-olefins, $C_6$-$C_{12}$ alpha-olefins, $C_6$-$C_{10}$ alpha-olefins, $C_6$-$C_8$ alpha-olefins, $C_8$-$C_{20}$ alpha-olefins, $C_{10}$-$C_{20}$ alpha-olefins, $C_{10}$-$C_{12}$ alpha-olefins, $C_{10}$-$C_{16}$ alpha-olefins, $C_{10}$-$C_{18}$ alpha-olefins, $C_{20}$-$C_{30+}$ alpha-olefins, or any combination thereof.

14. The roofing membrane of claim 11, wherein the polypropylene copolymer comprises at least one of a first non-styrene polypropylene copolymer, a first polypropylene impact copolymer, or any combination thereof.

15. The roofing membrane of claim 11, wherein the cap layer comprises:

10% to 80% by weight of a first non-styrenic polypropylene copolymer based on the total weight of the cap layer;

10% to 50% by weight of a first polypropylene impact copolymer based on the total weight of the cap layer; and 1% to 10% by weight of a first polypropylene elastomer based on the total weight of the cap layer.

16. The roofing membrane of claim 15, wherein the cap layer comprises 1% to 25% by weight of the flame retardant based on the total weight of the cap layer.

17. The roofing membrane of claim 11, wherein the core polymer layer comprises a plurality of sublayers.

18. The roofing membrane of claim 11, wherein the core polymer layer comprises at least one of a second non-styrenic polypropylene copolymer, a second polypropylene impact copolymer, a second polypropylene elastomer, or any combination thereof.

19. The roofing membrane of claim 11, wherein the core polymer layer comprises:

a second polypropylene impact copolymer;

10% to 80% by weight of a second non-styrenic polypropylene copolymer based on a total weight of the core polymer layer; and 1% to 10% by weight of a second polypropylene elastomer based on the total weight of the core polymer layer.

20. The roofing membrane of claim 18, wherein the core polymer layer further comprises 1% to 60% by weight of a filler based on the total weight of the core polymer layer.

* * * * *